(12) United States Patent
Archer et al.

(10) Patent No.: US 8,886,916 B2
(45) Date of Patent: *Nov. 11, 2014

(54) ENDPOINT-BASED PARALLEL DATA PROCESSING WITH NON-BLOCKING COLLECTIVE INSTRUCTIONS IN A PARALLEL ACTIVE MESSAGING INTERFACE OF A PARALLEL COMPUTER

(71) Applicant: International Business Machines Corporation, Armonk, NY (US)

(72) Inventors: Charles J. Archer, Rochester, MN (US); Michael A. Blocksome, Rochester, MN (US); Bob R. Cernohous, Rochester, MN (US); Joseph D. Ratterman, Seattle, WA (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,762

(22) Filed: Nov. 8, 2012

(65) Prior Publication Data
US 2013/0074097 A1    Mar. 21, 2013

Related U.S. Application Data

(63) Continuation of application No. 13/007,848, filed on Jan. 17, 2011.

(51) Int. Cl.
*G06F 9/46* (2006.01)
*G06F 9/54* (2006.01)

(52) U.S. Cl.
CPC .................................. *G06F 9/54* (2013.01)
USPC ............................................ 712/16; 709/201

(58) Field of Classification Search
USPC ............................................ 709/201; 712/16
See application file for complete search history.

(56) References Cited

U.S. PATENT DOCUMENTS

| 4,893,303 A | 1/1990 | Nakamura |
| 5,488,608 A | 1/1996 | Flammer, III |

(Continued)

OTHER PUBLICATIONS

Kumar et al., "The deep computing messaging framework: generalized scalable message passing blue gene/P supercomputer", Jun. 8, ICS '08 Proceedings of the 22nd annual international conference on Supercomputing, pp. 94-103.*

(Continued)

*Primary Examiner* — Andrew Caldwell
*Assistant Examiner* — Yuqing Xiao
(74) *Attorney, Agent, or Firm* — Biggers Kennedy Lenart Spraggins LLP

(57) ABSTRACT

Endpoint-based parallel data processing with non-blocking collective instructions in a PAMI of a parallel computer is disclosed. The PAMI is composed of data communications endpoints, each including a specification of data communications parameters for a thread of execution on a compute node, including specifications of a client, a context, and a task. The compute nodes are coupled for data communications through the PAMI. The parallel application establishes a data communications geometry specifying a set of endpoints that are used in collective operations of the PAMI by associating with the geometry a list of collective algorithms valid for use with the endpoints of the geometry; registering in each endpoint in the geometry a dispatch callback function for a collective operation; and executing without blocking, through a single one of the endpoints in the geometry, an instruction for the collective operation.

7 Claims, 13 Drawing Sheets

(56) References Cited

U.S. PATENT DOCUMENTS

| | | | |
|---|---|---|---|
| 5,802,278 A | 9/1998 | Isfeld et al. | |
| 6,070,189 A | 5/2000 | Bender et al. | |
| 6,337,852 B1 | 1/2002 | Desnoyers et al. | |
| 6,438,748 B1 | 8/2002 | Gard et al. | |
| 6,519,310 B2 | 2/2003 | Chapple | |
| 6,553,002 B1 | 4/2003 | Bremer et al. | |
| 6,553,031 B1 | 4/2003 | Nakamura et al. | |
| 6,591,310 B1 | 7/2003 | Johnson | |
| 6,601,089 B1 | 7/2003 | Sistare et al. | |
| 6,801,927 B1 | 10/2004 | Smith et al. | |
| 6,847,911 B2 | 1/2005 | Huckaby et al. | |
| 6,847,991 B1 | 1/2005 | Kurapati | |
| 6,993,769 B2 | 1/2006 | Simonson et al. | |
| 7,155,560 B2 | 12/2006 | McGrew et al. | |
| 7,237,036 B2 | 6/2007 | Boucher et al. | |
| 7,328,300 B2 | 2/2008 | Bennett | |
| 7,392,352 B2 | 6/2008 | Mithal et al. | |
| 7,418,470 B2 * | 8/2008 | Howard et al. | 709/201 |
| 7,464,138 B2 | 12/2008 | Le et al. | |
| 7,533,197 B2 | 5/2009 | Leonard et al. | |
| 7,552,312 B2 | 6/2009 | Archer et al. | |
| 7,673,011 B2 | 3/2010 | Archer et al. | |
| 7,991,978 B2 | 8/2011 | Kuesel et al. | |
| 8,001,280 B2 | 8/2011 | Blumrich et al. | |
| 8,018,951 B2 | 9/2011 | Blocksome | |
| 8,041,969 B2 | 10/2011 | Archer et al. | |
| 8,250,164 B2 | 8/2012 | Archer et al. | |
| 8,286,188 B1 | 10/2012 | Brief | |
| 2002/0054051 A1 | 5/2002 | Ladd | |
| 2003/0093485 A1 | 5/2003 | Dougall et al. | |
| 2003/0195991 A1 | 10/2003 | Masel et al. | |
| 2005/0166209 A1 | 7/2005 | Merrick et al. | |
| 2005/0289235 A1 | 12/2005 | Suematsu et al. | |
| 2006/0059257 A1 | 3/2006 | Collard et al. | |
| 2006/0101104 A1 | 5/2006 | Bhanot et al. | |
| 2006/0182128 A1 | 8/2006 | Nakata et al. | |
| 2006/0227774 A1 | 10/2006 | Hoenicke | |
| 2007/0078997 A1 | 4/2007 | Stern | |
| 2007/0124453 A1 | 5/2007 | Slaughter et al. | |
| 2007/0169176 A1 | 7/2007 | Cook et al. | |
| 2007/0169179 A1 | 7/2007 | Narad | |
| 2008/0101295 A1 | 5/2008 | Tomita et al. | |
| 2008/0126739 A1 | 5/2008 | Archer et al. | |
| 2008/0281998 A1 | 11/2008 | Archer et al. | |
| 2009/0003344 A1 | 1/2009 | Kumar | |
| 2009/0006808 A1 | 1/2009 | Blumrich et al. | |
| 2009/0006810 A1 * | 1/2009 | Almasi et al. | 712/35 |
| 2009/0007141 A1 | 1/2009 | Blocksome et al. | |
| 2009/0022156 A1 | 1/2009 | Blocksome | |
| 2009/0037377 A1 | 2/2009 | Archer et al. | |
| 2009/0089670 A1 | 4/2009 | Gooding et al. | |
| 2009/0129277 A1 | 5/2009 | Supalov et al. | |
| 2009/0138892 A1 | 5/2009 | Almasi et al. | |
| 2009/0254920 A1 | 10/2009 | Truschin et al. | |
| 2010/0005189 A1 * | 1/2010 | Archer et al. | 709/235 |
| 2010/0036940 A1 | 2/2010 | Carey et al. | |
| 2010/0058356 A1 | 3/2010 | Aho et al. | |
| 2010/0232448 A1 | 9/2010 | Sugumar et al. | |
| 2011/0314255 A1 | 12/2011 | Krishna et al. | |
| 2012/0079035 A1 | 3/2012 | Archer et al. | |
| 2012/0079133 A1 | 3/2012 | Archer et al. | |
| 2012/0117137 A1 | 5/2012 | Blocksome et al. | |
| 2012/0117138 A1 | 5/2012 | Blocksome et al. | |
| 2012/0117211 A1 | 5/2012 | Blocksome et al. | |
| 2012/0117281 A1 | 5/2012 | Blocksome et al. | |
| 2012/0137294 A1 | 5/2012 | Archer et al. | |
| 2012/0144400 A1 | 6/2012 | Davis et al. | |
| 2012/0144401 A1 | 6/2012 | Faraj | |
| 2012/0151485 A1 | 6/2012 | Archer et al. | |
| 2012/0185679 A1 | 7/2012 | Archer et al. | |
| 2012/0185873 A1 | 7/2012 | Archer et al. | |
| 2012/0254344 A1 | 10/2012 | Archer et al. | |
| 2013/0061244 A1 | 3/2013 | Davis et al. | |
| 2013/0061245 A1 | 3/2013 | Faraj | |
| 2013/0067111 A1 | 3/2013 | Archer et al. | |
| 2013/0067206 A1 | 3/2013 | Archer et al. | |
| 2013/0073751 A1 | 3/2013 | Blocksome et al. | |
| 2013/0074097 A1 | 3/2013 | Archer et al. | |
| 2013/0081059 A1 | 3/2013 | Archer et al. | |
| 2013/0091510 A1 | 4/2013 | Archer et al. | |
| 2013/0097263 A1 | 4/2013 | Blocksome et al. | |
| 2013/0097404 A1 | 4/2013 | Blocksome et al. | |
| 2013/0097614 A1 | 4/2013 | Blocksome et al. | |
| 2013/0110901 A1 | 5/2013 | Blocksome et al. | |
| 2013/0117403 A1 | 5/2013 | Archer et al. | |
| 2013/0117761 A1 | 5/2013 | Archer et al. | |
| 2013/0117764 A1 | 5/2013 | Archer et al. | |
| 2013/0124666 A1 | 5/2013 | Archer et al. | |
| 2013/0125135 A1 | 5/2013 | Archer et al. | |
| 2013/0125140 A1 | 5/2013 | Archer et al. | |
| 2013/0174180 A1 | 7/2013 | Blocksome et al. | |
| 2013/0185465 A1 | 7/2013 | Blocksome | |

OTHER PUBLICATIONS

Banikazemi et al., "MPI-LAPI: an efficient implementation of MPI for IBM RS/6000 SP systems", Oct. 2001, IEEE Transactions on Parallel and Distributed Systems, vol. 12, Issue: 10, pp. 1081-1093.*

Myrinet, "Myrinet Express (MX): A High-Performance, Low-Level, Message-Passing Interface for Myrinet", Myricom, Version 1.2, Oct. 6, pp. 1-65.*

Dinan et al., "Hybrid parallel programming with MPI and unified parallel C", May 10, CF '10 Proceedings of the 7th ACM international conference on Computing frontiers, pp. 177-186.*

Dózsa et al., "Enabling concurrent multithreaded MPI communication on multicore petascale systems", Apr. 2010, EuroMPI'10 Proceedings of the 17th European MPI users' group meeting conference on Recent advances in the message passing interface, pp. 11-20 (reprinted pp. 1-9).*

Robinson et al., "A Task Migration Implementation of the Message-Passing Interference", May 1996, IEEE, HPDC 5'96,pp. 61-68.

Office Action, U.S. Appl. No. 12/959,539, Oct. 26, 2012.

Office Action, U.S. Appl. No. 12/892,192, Oct. 30, 2012.

Final Office Action, U.S. Appl. No. 12/892,153, Sep. 25, 2012.

Office Action, U.S. Appl. No. 12/940,300, Sep. 19, 2012.

Office Action, U.S. Appl. No. 12/963,694, Dec. 24, 2012.

Office Action, U.S. Appl. No. 13/290,670, Dec. 17, 2012.

Office Action, U.S. Appl. No. 13/290,642, Jan. 7, 2013.

U.S. Appl. No. 12/985,651, filed Jan. 6, 2011.

U.S. Appl. No. 13/290,670, filed Nov. 7, 2011.

U.S. Appl. No. 13/290,642, filed Nov. 7, 2011.

U.S. Appl. No. 13/292,293, filed Nov. 9, 2011.

U.S. Appl. No. 13/659,370, filed Oct. 24, 2012.

U.S. Appl. No. 13/659,458, filed Oct. 24, 2012.

U.S. Appl. No. 13/668,503, filed Nov. 5, 2012.

U.S. Appl. No. 13/671,762, filed Nov. 8, 2012.

U.S. Appl. No. 13/673,188, filed Nov. 9, 2012.

U.S. Appl. No. 13/677,993, filed Nov. 15, 2012.

U.S. Appl. No. 13/678,799, filed Nov. 16, 2012.

U.S. Appl. No. 13/677,507, filed Nov. 15, 2012.

U.S. Appl. No. 13/679,042, filed Nov. 16, 2012.

U.S. Appl. No. 13/690,168, filed Nov. 30, 2012.

U.S. Appl. No. 13/681,903, filed Nov. 20, 2012.

U.S. Appl. No. 13/680,772, filed Nov. 19, 2012.

Robinson et al., "A Task Migration Implementation of the Message-Passing Interface", May 1996, IEEE, HPDC-5'96, pp. 61-68.

Notice of Allowance, U.S. Appl. No. 12/959,455, Mar. 1, 2013.

Notice of Allowance, U.S. Appl. No. 12/959,539, Mar. 6, 2013.

Office Action, U.S. Appl. No. 13/007,860, Mar. 19, 2013.

Office Action, U.S. Appl. No. 12/963,671, Mar. 1, 2013.

Office Action, U.S. Appl. No. 12/940,198, Feb. 14, 2013.

Office Action, U.S. Appl. No. 12/940,282, Feb. 5, 2013.

Notice of Allowance, U.S. Appl. No. 13/290,670, Mar. 27, 2013.

Office Action, U.S. Appl. No. 13/668,503, Feb. 13, 2013.

Office Action, U.S. Appl. No. 13/673,188, Mar. 5, 2013.

Office Action, U.S. Appl. No. 13/678,799, Feb. 5, 2013.

Office Action, U.S. Appl. No. 13/681,903, Apr. 2, 2013.

Office Action, U.S. Appl. No. 13/709,305, Mar. 25, 2013.

Office Action, U.S. Appl. No. 13/711,108, Mar. 22, 2013.

(56) References Cited

OTHER PUBLICATIONS

Knudson, Brant; "IBM System Blue Gene Solution: Blue Gene/P Application Development," *IBM Redbooks,* pp. 1-406, Sep. 2009.
Foster et al., "Managing Multiple Communication Methods in High-Performance Networked Computing Systems", Journal of Parallel and Distributed Computing, Jan. 1997, vol. 40, issue 1, 25 pages, Elsevier Inc., USA.
Hairi et al., "A Message Passing Interface for Parallel and Distributed Computing," Proceedings the 2nd International Symposium on High Performance Distributed Computing, Jul. 1993, pp. 84-91, Institute of Electrical and Electronics Engineers, Inc. (IEEE) Computer Society Press, Los Alamitos, CA.
Kuiper, "Introduction to Parallel Computing and the Message Passing Interface (MPI)", Lecture on Numerical Fluid Dynamics by Dr. Cornelis P. Dullemond, Jul. 2008, 39 pages, University of Heidelberg, Germany.
Li et al., "Parallel net DCF: A High-Performance Scientific I/O Interface", Supercomputing Conference on High Performance Computing Networking (SC'03), Nov. 2003, 11 pages, ACM New York, USA.
Loewe, "HPSS MPI-IO: A Standard Parallel Interface to HPSS File System", Scalable I/O Presentation, Oct. 2001, pp. 1-19, Lawrence Livermore National Laboratory (LLNL), Livermore, CA.
Schiff et al., "Robust Message-Passing for Statistical Inference in Sensor Network", Sixth International Conference on Information Processing in Sensor Networks (ISPN'07), Apr. 2007, pp. 109-118, ACM New York, USA.
Office Action, U.S. Appl. No. 12/892,153, Jun. 1, 2012, 1-10.
Kumar et al., "The Deep Computing Messaging Framework: Generalized Scalable Message Passing Blue Gene/P Supercomputer", Proceedings of the 22nd Annual International Conference on Supercomputing (ICS '08), Jun. 2008, pp. 94-103, ACM New York, USA.
Banikazemi et al., "MPI-LAPI: An Efficient Implementation of MPI for IBM RS/6000 SP Systems", IEEE Transactions on Parallel and Distributed Systems, Oct. 2001, vol. 12, Issue 10, pp. 1081-1093, IEEE Xplore Digital Library (online publication), IEEE.org, USA.
Myricom, "Myrinet Express (MX): A High-Performance, Low-Level, Message-Passing Interface for Myrinet", Myricom.com (online publication), Version 1.2, Oct. 2006, pp. 1-65, Myricom Inc., USA.
Dinan et al., "Hybrid Parallel Programming With MPI and Unified Parallel C", Proceedings of the 7th ACM International Conference on Computing Frontiers (CF'10), May 2010, pp. 177-186, ACM New York, USA.
Dozsa et al., "Enabling Concurrent Multithreaded MPI Communication on Multicore Petascale Systems", Proceedings of the 17th European MPI Users' Group Meeting Conference on Recent Advances in the Message Passing Interface (EuroMPI'10), Apr. 2010, pp. 11-20 (reprinted pp. 1-9), Springer-Verlag Berlin, Heidelberg.
Foster et al., "Managing Multiple Communication Methods in High-Performance Networked Computing Systems", Journal of Parallel and Distributed Computing, vol. 40, Issue 1, Jan. 1997, pp. 1-25, (online publication), ScienceDirect.com, USA.
Robinson et al., "A Task Migration Implementation of the Message-Passing Interface", Proceedings of the 5th IEEE International Symposium on High Performance Distributed Computing (HPDC'96), May 1996, pp. 61-68, IEEE Computer Society, Washington DC, USA.
Blocksome, "Optimizing MPI Collectives using Efficient Intra-node Communication Techniques over the BlueGene/P Supercomputer," *Computer Science IBM Research Report,* Dec. 2010, 25 pages, IBM Corporation, USA.
Final Office Action, U.S. Appl. No. 12/892,192, May 2, 2013, 1-25.
Office Action, U.S. Appl. No. 12/892,192, Sep. 30, 2013, 1-15.
Notice of Allowance, U.S. Appl. No. 13/007,860, Jul. 3, 2013, 1-8.
Office Action, U.S. Appl. No. 12/892,153, Apr. 25, 2013, 1-14.
Final Office Action, U.S. Appl. No. 12/892,153, Aug. 14, 2013, 1-9.
Office Action, U.S. Appl. No. 12/985,611, Aug. 2, 2013, 1-23.
Office Action, U.S. Appl. No. 13/007,848, May 15, 2013, 1-25.
Final Office Action, U.S. Appl. No. 13/007,848, Sep. 13, 2013, 1-24.
Notice of Allowance, U.S. Appl. No. 12/963,671, Sep. 18, 2013, 1-16.
Final Office Action, U.S. Appl. No. 12/940,198, Aug. 14, 2013, 1-16.
Final Office Action, U.S. Appl. No. 12/940,259, Aug. 14, 2013, 1-20.
Final Office Action, U.S. Appl. No. 12/940,282, Sep. 10, 2013, 1-17.
Notice of Allowance, U.S. Appl. No. 12/940,300, Apr. 29, 2013, 1-11.
Notice of Allowance, U.S. Appl. No. 12/963,694, Jun. 18, 2013, 1-21.
Office Action, U.S. Appl. No. 12/985,651, Aug. 5, 2013, 1-19.
Notice of Allowance, U.S. Appl. No. 13/290,670, Mar. 27, 2013, 1-19.
Notice of Allowance, U.S. Appl. No. 13/290,642, May 1, 2013, 1-24.
Office Action, U.S. Appl. No. 13/292,293, Jul. 19, 2013, 1-36.
Office Action, U.S. Appl. No. 13/659,370, Oct. 21, 2013, 1-22.
Final Office Action, U.S. Appl. No. 13/668,503, Jul. 11, 2013, 1-26.
Office Action, U.S. Appl. No. 13/671,762 May 13, 2013, 1-22.
Final Office Action, U.S. Appl. No. 13/671,762, Sep. 13, 2013, 1-21.
Office Action, U.S. Appl. No. 13/673,188, Jul. 25, 2013, 1-26.
Final Office Action, U.S. Appl. No. 13/678,799, Aug. 30, 2013, 1-17.
Final Office Action, U.S. Appl. No. 13/677,507, Aug. 22, 2013, 1-21.
Office Action, U.S. Appl. No. 13/676,700, Jun. 5, 2013, 1-31.
Office Action, U.S. Appl. No. 13/690,168, Aug. 15, 2013, 1-30.
Notice of Allowance, U.S. Appl. No. 13/681,903, Sep. 30, 2013, 1-18.
Office Action, U.S. Appl. No. 13/680,772, Aug. 15, 2013, 1-31.
Office Action, U.S. Appl. No. 13/710,066, Jul. 19, 2013, 1-36.
Notice of Allowance, U.S. Appl. No. 13/709,305, Aug. 27, 2013, 1-19.
Final Office Action, U.S. Appl. No. 13/711,108, Jul. 5, 2013, 1-34.
Notice of Allowance, U.S. Appl. No. 13/711,108, Sep. 19, 2013, 1-17.
Notice of Allowance, U.S. Appl. No. 13/784,198, Sep. 20, 2013, 1-11.
Final Office Action, U.S. Appl. No. 12/956,903, Nov. 6, 2013, 1-20.
Notice of Allowance, U.S. Appl. No. 13/292,293, Nov. 7, 2013, 1-20.
Notice of Allowance, U.S. Appl. No. 12/985,651, Feb. 20, 2014, pp. 1-14.
Notice of Allowance, U.S. Appl. No. 13/659,370, Mar. 13, 2014, pp. 1-15.

* cited by examiner

US 8,886,916 B2

ENDPOINT-BASED PARALLEL DATA PROCESSING WITH NON-BLOCKING COLLECTIVE INSTRUCTIONS IN A PARALLEL ACTIVE MESSAGING INTERFACE OF A PARALLEL COMPUTER

CROSS-REFERENCE TO RELATED APPLICATION

This application is a continuation application of and claims priority from U.S. patent application Ser. No. 13/007,848, filed on Jan. 17, 2011.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for endpoint-based parallel data processing with non-blocking active collective instructions in a parallel active messaging interface ('PAMI') of a parallel computer.

2. Description of Related Art

The development of the Electronic Discrete Variable Automatic Computer (EDVAC) computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same application (split up and specially adapted) on multiple processors in order to obtain results faster. Parallel computing is based on the fact that the process of solving a problem usually can be divided into smaller jobs, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes. Parallel algorithms are valuable because it is faster to perform some kinds of large computing jobs via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource, the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

At the same time, the network link speed and number of links into and out of a compute node are dramatically increasing. IBM's BlueGene/Q™ supercomputer, for example, will have a five-dimensional torus network, which implements ten bidirectional data communications links per compute node—and BlueGene/Q will support many thousands of compute nodes. To keep these links filled with data, Direct Memory Access (DMA) engines are employed, but increasingly, the High Performance Computing (HPC) community is interested in latency. In traditional supercomputers with pared-down operating systems, there is little or no multi-tasking within compute nodes. When a data communications link is unavailable, a task typically blocks or 'spins' on a data transmission, in effect, idling a processor until a data transmission resource becomes available. In the trend for more powerful individual processors, such blocking or spinning has a bad effect on latency.

SUMMARY OF THE INVENTION

Methods, parallel computers, and computer program products for endpoint-based parallel data processing with non-blocking collective instructions in a parallel active messaging interface ('PAMI') of a parallel computer, the parallel computer including a plurality of compute nodes that execute a parallel application, the PAMI composed of data communications endpoints, each endpoint including a specification of data communications parameters for a thread of execution on a compute node, including specifications of a client, a context, and a task, the compute nodes coupled for data communications through the PAMI, including establishing by the parallel application a data communications geometry, the geometry specifying, for tasks representing processes of execution of the parallel application, a set of endpoints that are used in collective operations of the PAMI, including associating with the geometry a list of collective algorithms valid for use with the endpoints of the geometry; registering, by the application in each endpoint in the geometry, a dispatch callback function for a collective operation; and executing, by the application without blocking, through a single one of the endpoints in the geometry, an instruction for the collective operation, the instruction specifying communications of transfer data among the endpoints of the geometry, an identifier of the dispatch callback function associated with the collective operation, and a collective algorithm.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
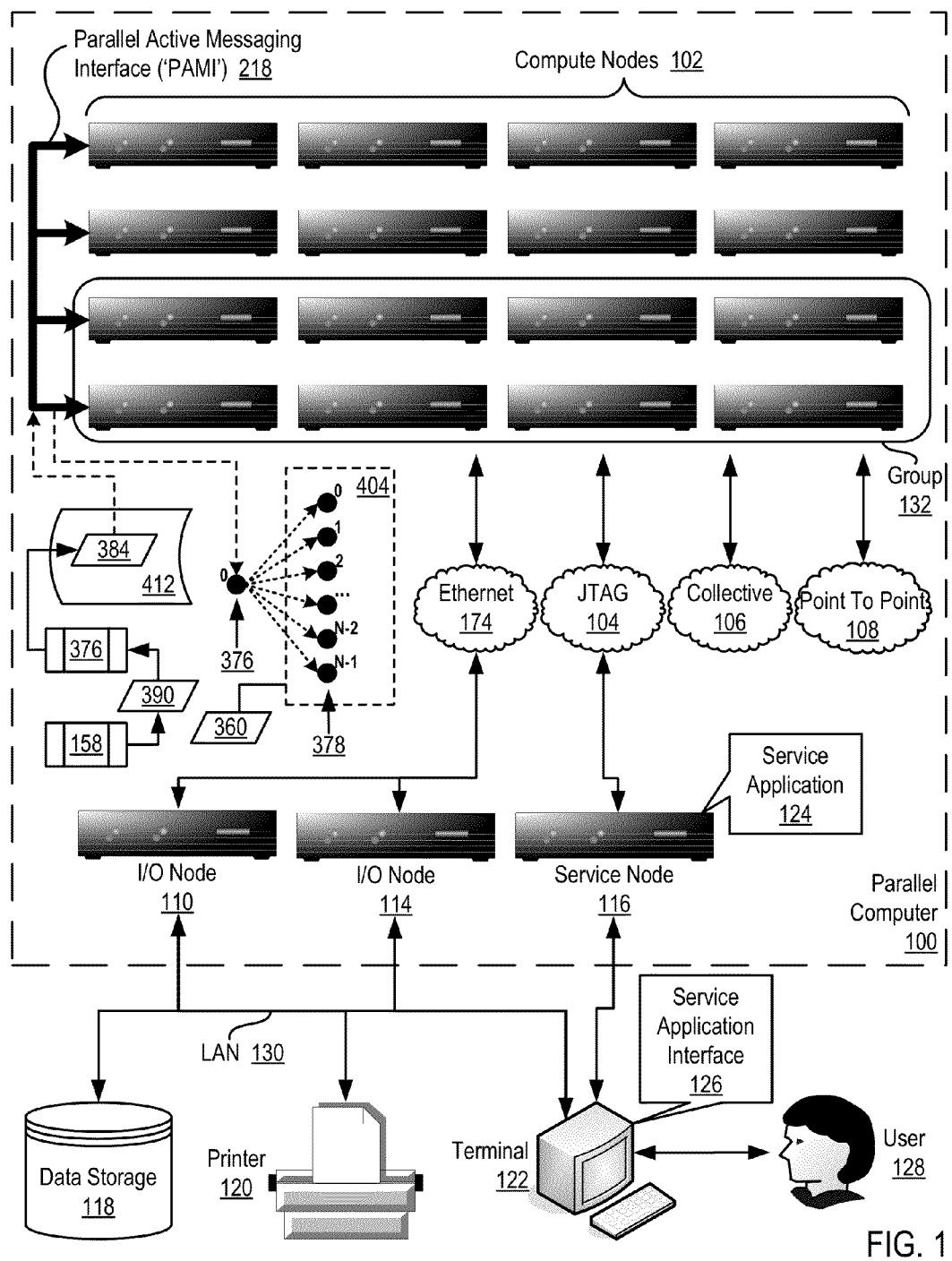
FIG. 1 sets forth a block and network diagram of an example parallel computer that implements endpoint-based parallel data processing in a parallel active messaging interface ('PAMI') according to embodiments of the present invention.

Example methods, computers, and computer program products for endpoint-based parallel data processing in a parallel active messaging interface ('PAMI') of a parallel computer according to embodiments of the present invention are described with reference to the accompanying drawings, beginning with FIG. 1. FIG. 1 sets forth a block and network diagram of an example parallel computer (100) that implements endpoint-based parallel data processing in a PAMI according to embodiments of the present invention. The parallel computer (100) in the example of FIG. 1 is coupled to non-volatile memory for the computer in the form of data storage device (118), an output device for the computer in the form of printer (120), and an input/output device for the computer in the form of computer terminal (122). The parallel computer (100) in the example of FIG. 1 includes a plurality of compute nodes (102).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art applications messaging module or parallel communications library, an application-level messaging module of computer program instructions for data communications on parallel computers. Such an application messaging module is disposed in an application messaging layer in a data communications protocol stack. Examples of prior-art parallel communications libraries that may be improved for use with parallel computers that implement endpoint-based parallel data processing in a PAMI of a parallel computer according to embodiments of the present invention include IBM's MPI library, the 'Parallel Virtual Machine' ('PVM') library, MPICH, OpenMPI, and Local Area Multicomputing/Message Passing Interface (LAM/MPI). MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
    MPI_MIN minimum
    MPI_SUM sum
    MPI_PROD product
    MPI_LAND logical and
    MPI_BAND bitwise and
    MPI_LOR logical or
    MPI_BOR bitwise or
    MPI_LXOR logical exclusive or
    MPI_BXOR bitwise exclusive or In addition to compute nodes, the example parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications to I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As the term is used here, a parallel active messaging interface or 'PAMI' (218) is a system-level messaging layer in a protocol stack of a parallel computer that is composed of data communications endpoints each of which is specified with data communications parameters for a thread of execution on a compute node of the parallel computer. The PAMI is a 'parallel' interface in that many instances of the PAMI operate in parallel on the compute nodes of a parallel computer. The PAMI is an 'active messaging interface' in that data communications messages in the PAMI are active messages, 'active' in the sense that such messages implement callback functions to advise of message dispatch and instruction completion and so on, thereby reducing the quantity of acknowledgment traffic, and the like, burdening the data communication resources of the PAMI.

Each data communications endpoint of a PAMI is implemented as a combination of a client, a context, and a task. A 'client' as the term is used in PAMI operations is a collection of data communications resources dedicated to the exclusive use of an application-level data processing entity, an application or an application messaging module such as an MPI library. A 'context' as the term is used in PAMI operations is composed of a subset of a client's collection of data processing resources, context functions, and a work queue of data transfer instructions to be performed by use of the subset through the context functions operated by an assigned thread of execution. In at least some embodiments, the context's subset of a client's data processing resources is dedicated to the exclusive use of the context. A 'task' as the term is used in PAMI operations refers to a canonical entity, an integer or objection oriented programming object that represents in a PAMI a process of execution of a parallel application. That is, a task is typically implemented as an identifier of a particular instance of an application executing on a compute node, a compute core on a compute node, or a thread of execution on a multi-threading compute core on a compute node.

In the example of FIG. 1, the compute nodes (102), as well as PAMI endpoints on the compute nodes, are coupled for data communications through the PAMI (218) and through data communications resources such as collective network (106) and point-to-point network (108). The implementation of endpoint-based parallel data processing by the parallel computer of FIG. 1 is further explained with reference to a send buffer (412) of a root task, a set of transfer data (384), a data communications geometry (404), and a set of endpoints (378) of the geometry. The parallel computer (100) of FIG. 1 operates generally to carry out endpoint-based parallel data processing with non-blocking collective instructions in a PAMI of a parallel computer according to embodiments of the present invention by establishing by an application-level entity (158), that is, an application as such or an application messaging module, for collective operations of the PAMI (218), a data communications geometry (404). The geometry specifies, for tasks representing processes of execution of a parallel application, a set of endpoints (378) that are used in collective operations of the PAMI. The parallel computer (100) of FIG. 1 further operates generally to carry out endpoint-based parallel data processing in a PAMI by associating with the geometry (404) a list (360) of collective algorithms valid for use with the endpoints of the geometry. The parallel computer also functions to register, in each endpoint (378) in the geometry, a dispatch callback function for a collective operation. The parallel computer also executes without blocking, through a single one (376) of the endpoints in the geometry, an instruction (390) for a collective operation, with the instruction specifying communications of transfer data (384), from a send buffer (412) of a root task, among the endpoints (378) of the geometry. The instruction (390) also specifies an identifier of the dispatch callback function associated with the collective operation and a collective algorithm that the PAMI follows in carrying out the actual transfer of data.

Examples of instruction types include SEND instructions for data transfers through networks, PUT instructions for data transfers through DMA, GET instructions for data transfer through segments of shared memory, and others. Data communications instructions, including instructions for collective operations, processed by the parallel computer here can include both eager data communications instructions, receive instructions, DMA PUT instructions, DMA GET instructions, and so on. Some data communications instructions, typically GETs and PUTs are one-sided DMA instructions in that there is no cooperation required from a target processor, no computation on the target side to complete such a PUT or GET because data is transferred directly to or from memory on the other side of the transfer. In this setting, the term 'target' is used for either PUT or GET. A PUT target receives data directly into its RAM from an origin endpoint. A GET target provides data directly from its RAM to the origin endpoint. Thus readers will recognize that the designation of an endpoint as an origin endpoint for a transfer is a designation of the endpoint that initiates execution of a DMA transfer instruction—rather than a designation of the direction of the transfer: PUT instructions transfer data from an origin endpoint to a target endpoint. GET instructions transfer data from a target endpoint to an origin endpoint.

In any particular communication of data, an origin endpoint and a target endpoint can be any two endpoints on any of the compute nodes (102), on different compute nodes, or two endpoints on the same compute node. Collective operations can have one origin endpoint and many target endpoints, as in a BROADCAST, for example, or many origin endpoints and one target endpoint, as in a GATHER, for example. A sequence of data communications instructions, including instructions for collective operations, resides in a work queue of a context and results in data transfers among endpoints, origin endpoints and target endpoints. Data communications instructions, including instructions for collective operations, are 'active' in the sense that the instructions implement callback functions to advise of and implement instruction dispatch and instruction completion, thereby reducing the quantity of acknowledgment traffic required on the network. Each such data communications instruction or instruction for a collective operation effects a data transfer or transfers, from one or more origin endpoints to one or more target endpoints, through some form of data communications resources, networks, shared memory segments, network adapters, DMA controllers, and the like.

The arrangement of compute nodes, networks, and I/O devices making up the example parallel computer illustrated in FIG. 1 are for explanation only, not for limitation of the present invention. Parallel computers capable of data communications in a PAMI according to embodiments of the present invention may include additional nodes, networks, devices, and architectures, not shown in FIG. 1, as will occur to those of skill in the art. For ease of explanation, the parallel computer in the example of FIG. 1 is illustrated with only one data buffer (412), one set of transfer data (384), and only a few endpoints (376, 378); readers will recognize, however, that practical embodiments of such a parallel computer will include many buffers, send buffers and receive buffers, many sets of transfer data, and many endpoints. The parallel computer (100) in the example of FIG. 1 includes sixteen compute nodes (102); some parallel computers that implement endpoint-based parallel data processing in a PAMI according to some embodiments of the present invention include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Endpoint-based parallel data processing in a PAMI according to embodiments of the present invention is generally implemented on a parallel computer that includes a plurality of compute nodes. In fact, such computers may include thousands of such compute nodes, with a compute node typically executing at least one instance of a parallel application. Each compute node is in turn itself a computer composed of one or more computer processors, its own computer memory, and its own input/output ('I/O') adapters. For further explanation, therefore, FIG. 2 sets forth a block diagram of an example compute node (152) for use in a parallel computer that implement endpoint-based parallel data processing in a PAMI according to embodiments of the present invention. The compute node (152) of FIG. 2 includes one or more computer processors (164) as well as random access memory ('RAM') (156). Each processor (164) can support multiple hardware compute cores (165), and each such core can in turn support multiple threads of execution, hardware threads of execution as well as software threads. Each processor (164) is connected to RAM (156) through a high-speed front side bus (161), bus adapter (194), and a high-speed memory bus (154)—and through bus adapter (194) and an extension bus (168) to other components of the compute node. Stored in RAM (156) is an application program (158), a module of computer program instructions that carries out parallel, user-level data processing using parallel algorithms.

Also stored RAM (156) is an application messaging module (216), a library of computer program instructions that carry out application-level parallel communications among compute nodes, including point to point operations as well as collective operations. Although the application program can call PAMI routines directly, the application program (158) often executes point-to-point data communications operations by calling software routines in the application messaging module (216), which in turn is improved according to embodiments of the present invention to use PAMI functions to implement such communications. An application messaging module can be developed from scratch to use a PAMI according to embodiments of the present invention, using a traditional programming language such as the C programming language or C++, for example, and using traditional programming methods to write parallel communications routines that send and receive data among PAMI endpoints and compute nodes through data communications networks or shared-memory transfers. In this approach, the application messaging module (216) exposes a traditional interface, such as MPI, to the application program (158) so that the application program can gain the benefits of a PAMI with no need to recode the application. As an alternative to coding from scratch, therefore, existing prior art application messaging modules may be improved to use the PAMI, existing modules that already implement a traditional interface. Examples of prior-art application messaging modules that can be improved to implement endpoint-based parallel data processing in a PAMI according to embodiments of the present invention include such parallel communications libraries as the traditional 'Message Passing Interface' ('MPI') library, the 'Parallel Virtual Machine' ('PVM') library, MPICH, and the like.

Figure 2:
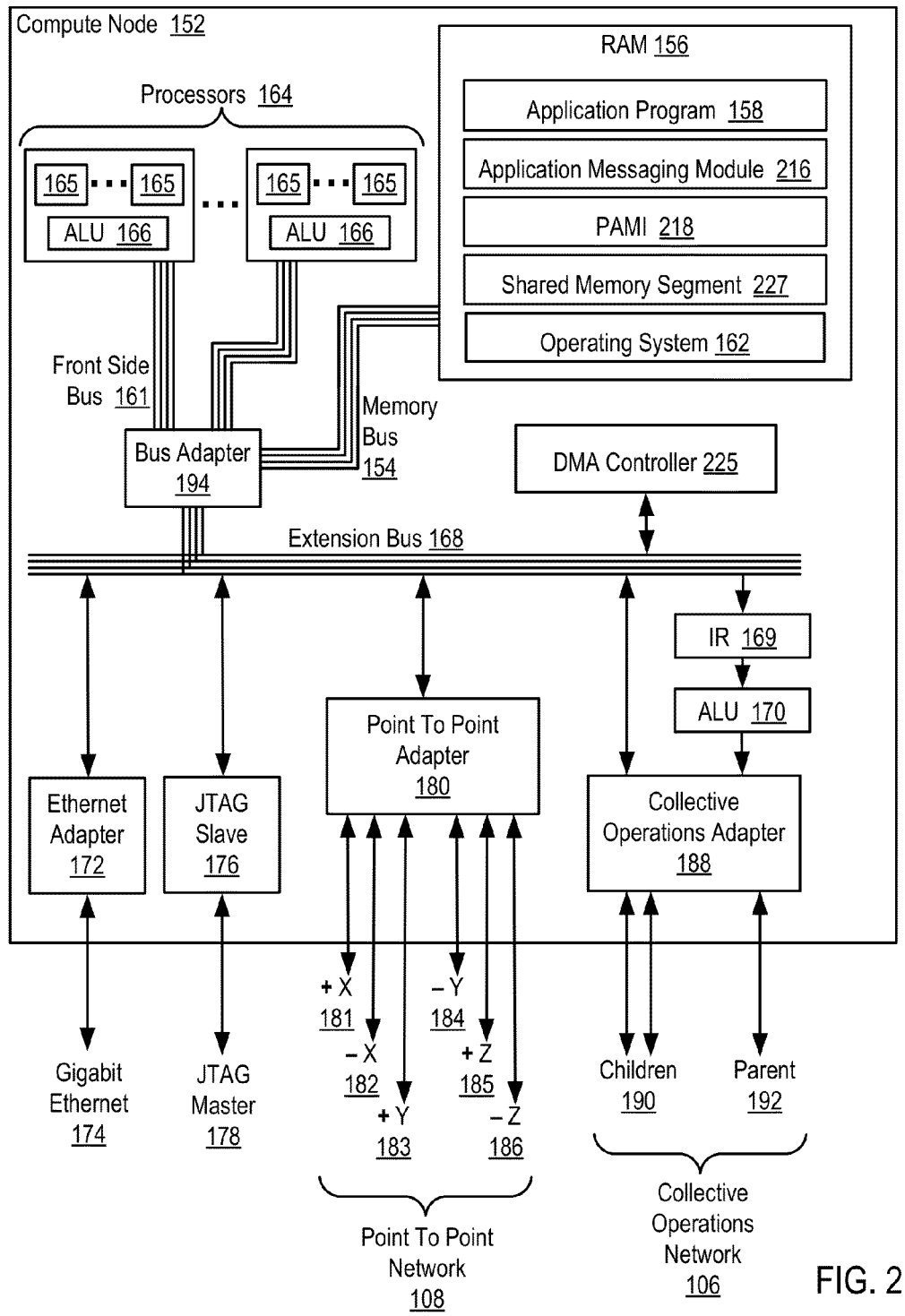
FIG. 2 sets forth a block diagram of an example compute node for use in parallel computers that implement endpoint-based parallel data processing in a PAMI according to embodiments of the present invention.

Also represented in RAM in the example of FIG. 2 is a PAMI (218). Readers will recognize, however, that the representation of the PAMI in RAM is a convention for ease of explanation rather than a limitation of the present invention, because the PAMI and its components, endpoints, clients, contexts, and so on, have particular associations with and inclusions of hardware data communications resources. In fact, the PAMI can be implemented partly as software or firmware and hardware—or even, at least in some embodiments, entirely in hardware.

Also represented in RAM (156) in the example of FIG. 2 is a segment (227) of shared memory. In typical operation, the operating system (162) in this example compute node assigns portions of address space to each processor (164), and, to the extent that the processors include multiple compute cores (165), treats each compute core as a separate processor with its own assignment of a portion of core memory or RAM (156) for a separate heap, stack, memory variable storage, and so on. The default architecture for such apportionment of memory space is that each processor or compute core operates its assigned portion of memory separately, with no ability to access memory assigned to another processor or compute core. Upon request, however, the operating system grants to one processor or compute core the ability to access a segment of memory that is assigned to another processor or compute core, and such a segment is referred to in this specification as a 'segment of shared memory.'

In the example of FIG. 2, each processor or compute core has uniform access to the RAM (156) on the compute node, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory can be configured locally for one endpoint and remotely for another endpoint—or remotely from both endpoints of a communication. From the perspective of an origin endpoint transmitting data through a segment of shared memory that is configured remotely with respect to the origin endpoint, transmitting data through the segment of shared memory will appear slower that if the segment of shared memory were configured locally with respect to the origin endpoint—or if the segment were local to both the origin endpoint and the target endpoint. This is the effect of the architecture represented by the compute node (152) in the example of FIG. 2 with all processors and all compute cores coupled through the same bus to the RAM—that all accesses to segments of memory shared among processes or processors on the compute node are local—and therefore very fast.

Also stored in RAM (156) in the example compute node of FIG. 2 is an operating system (162), a module of computer program instructions and routines for an application program's access to other resources of the compute node. It is possible, in some embodiments at least, for an application program, an application messaging module, and a PAMI in a compute node of a parallel computer to run threads of execution with no user login and no security issues because each such thread is entitled to complete access to all resources of the node. The quantity and complexity of duties to be performed by an operating system on a compute node in a parallel computer therefore can be somewhat smaller and less complex than those of an operating system on a serial computer with many threads running simultaneously with various level of authorization for access to resources. In addition, there is no video I/O on the compute node (152) of FIG. 2, another factor that decreases the demands on the operating system. The operating system may therefore be quite lightweight by comparison with operating systems of general purpose computers, a pared down or 'lightweight' version as it were, or an operating system developed specifically for operations on a particular parallel computer. Operating systems that may be improved or simplified for use in a compute node according to embodiments of the present invention include UNIX™, Linux™, Microsoft XP™, AIX™, IBM's i5/OS™, and others as will occur to those of skill in the art.

The example compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus (USB), through data communications networks such as IP networks, and in other ways as will occur to those of skill in the art. Communications adapters implement the hardware level of data communications through which one computer sends data communications to another computer, directly or through a network. Examples of communications adapters for use in computers that implement endpoint-based parallel data processing in a parallel active messaging interface ('PAMI') according to embodiments of the present invention include modems for wired communications, Ethernet (Institute of Electrical and Electronics Engineers (IEEE) 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also used as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in data communications in a PAMI according to embodiments of the present invention.

The data communications adapters in the example of FIG. 2 includes a Point To Point Adapter (180) that couples example compute node (152) for data communications to a data communications network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186). For ease of explanation, the Point To Point Adapter (180) of FIG. 2 as illustrated is configured for data communications in three dimensions, x, y, and z, but readers will recognize that Point To Point Adapters optimized for point-to-point operations in data communications in a PAMI of a parallel computer according to embodiments of the present invention may in fact be implemented so as to support communications in two dimensions, four dimensions, five dimensions, and so on.

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

The example compute node (152) includes a number of arithmetic logic units ('ALUs'). ALUs (166) are components of processors (164), and a separate ALU (170) is dedicated to the exclusive use of collective operations adapter (188) for use in performing the arithmetic and logical functions of reduction operations. Computer program instructions of a reduction routine in an application messaging module (216) or a PAMI (218) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of an ALU (166) in a processor (164) or, typically much faster, by use of the dedicated ALU (170).

The example compute node (152) of FIG. 2 includes a direct memory access ('DMA') controller (225), a module of automated computing machinery that implements, through communications with other DMA engines on other compute nodes, or on a same compute node, direct memory access to and from memory on its own compute node as well as memory on other compute nodes. Direct memory access is a way of reading and writing to and from memory of compute nodes with reduced operational burden on computer processors (164); a CPU initiates a DMA transfer, but the CPU does not execute the DMA transfer. A DMA transfer essentially copies a block of memory from one compute node to another, or between RAM segments of applications on the same compute node, from an origin to a target for a PUT operation, from a target to an origin for a GET operation.

Figure 3A:
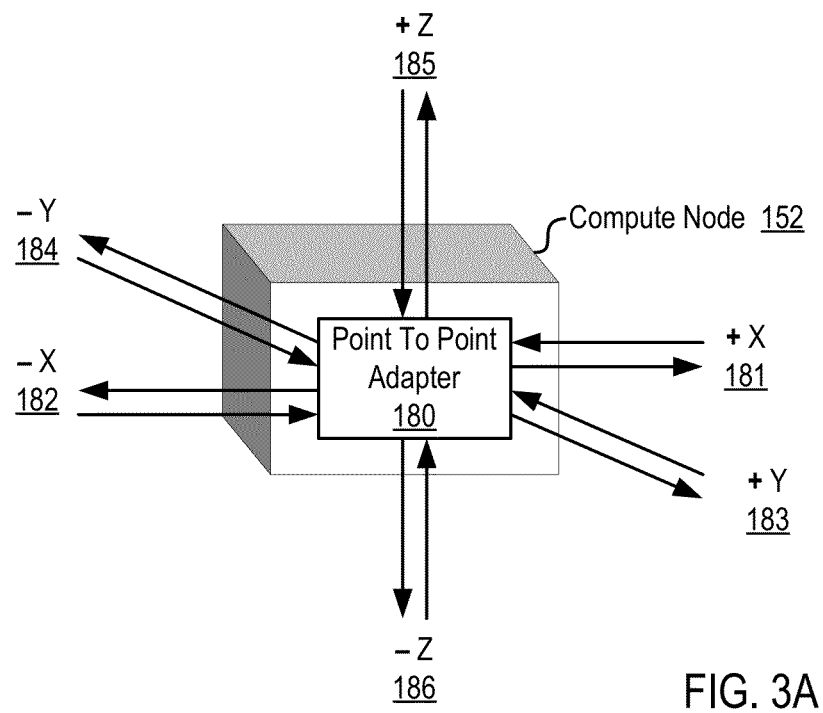
FIG. 3A illustrates an example Point To Point Adapter for use in parallel computers that implement endpoint-based parallel data processing in a PAMI according to embodiments of the present invention.

For further explanation, FIG. 3A illustrates an example of a Point To Point Adapter (180) useful in parallel computers that implement endpoint-based parallel data processing in a PAMI according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185). For ease of explanation, the Point To Point Adapter (180) of FIG. 3A as illustrated is configured for data communications in only three dimensions, x, y, and z, but readers will recognize that Point To Point Adapters optimized for point-to-point operations in a parallel computer that implements endpoint-based parallel data processing according to embodiments of the present invention may in fact be implemented so as to support communications in two dimensions, four dimensions, five dimensions, and so on. Several supercomputers now use five dimensional mesh or torus networks, including, for example, IBM's Blue Gene Q™.

Figure 3B:
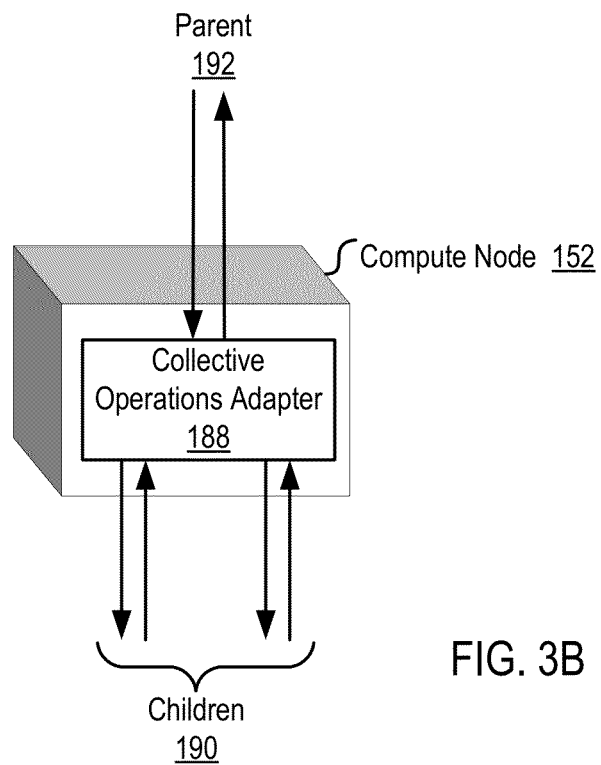
FIG. 3B illustrates an example Collective Operations Adapter for use in parallel computers that implement endpoint-based parallel data processing in a PAMI according to embodiments of the present invention.

For further explanation, FIG. 3B illustrates an example of a Collective Operations Adapter (188) useful in a parallel computer that implements endpoint-based parallel data processing in a PAMI according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
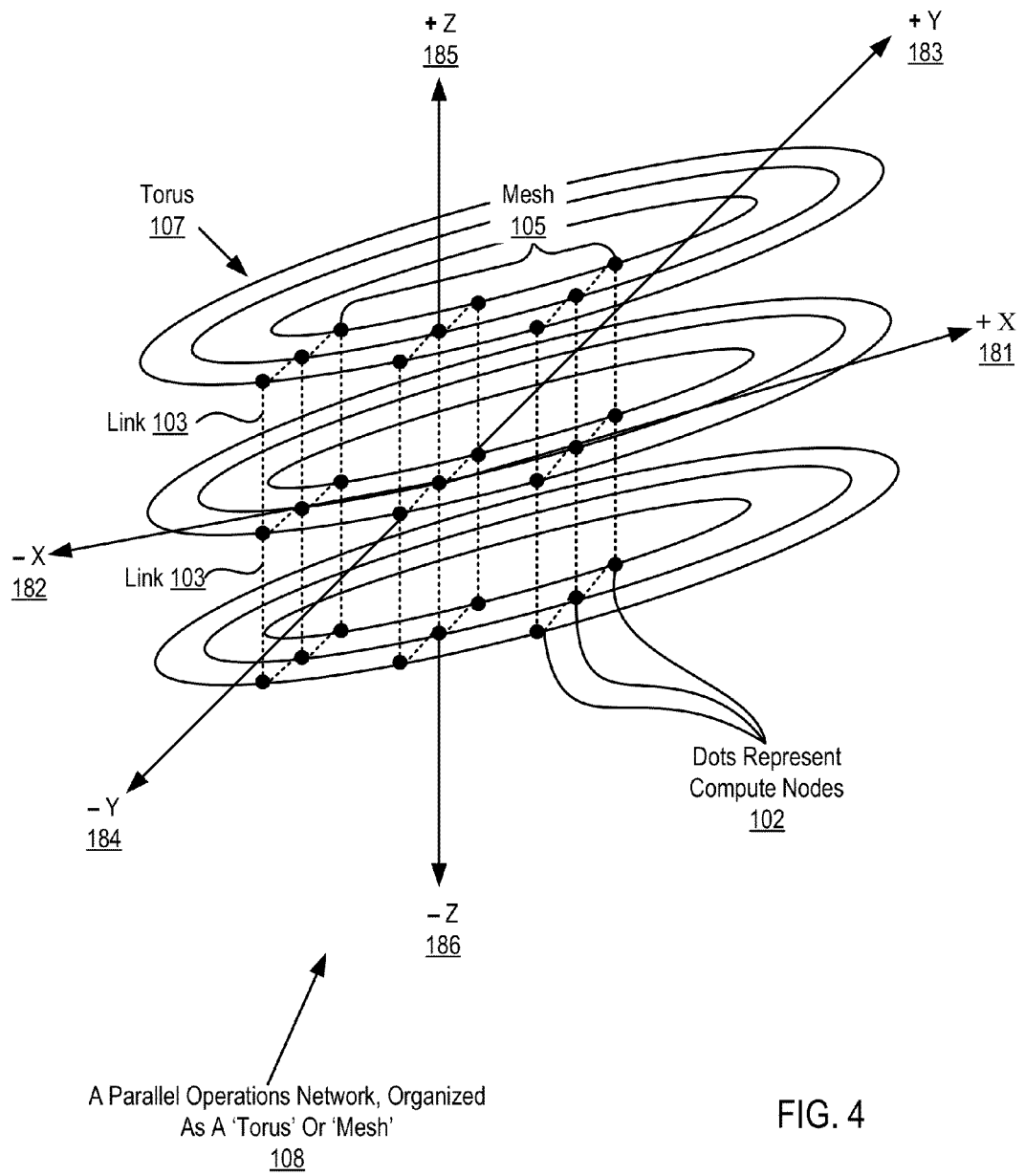
FIG. 4 illustrates an example data communications network optimized for point to point operations for use in parallel computers that implement endpoint-based parallel data processing in a PAMI according to embodiments of the present invention.

For further explanation, FIG. 4 sets forth a line drawing illustrating an example data communications network (108) optimized for point-to-point operations useful in parallel computers that implement endpoint-based parallel data processing in a PAMI according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations in a parallel computer that implements endpoint-based parallel data processing according to embodiments of the present invention may contain only a few compute nodes or may contain thousands of compute nodes. For ease of explanation, the data communications network of FIG. 4 is illustrated with only three dimensions: x, y, and z, but readers will recognize that a data communications network optimized for point-to-point operations may in fact be implemented in two dimensions, four dimensions, five dimensions, and so on. As mentioned, several supercomputers now use five dimensional mesh or torus networks, including IBM's Blue Gene Q™.

Figure 5:
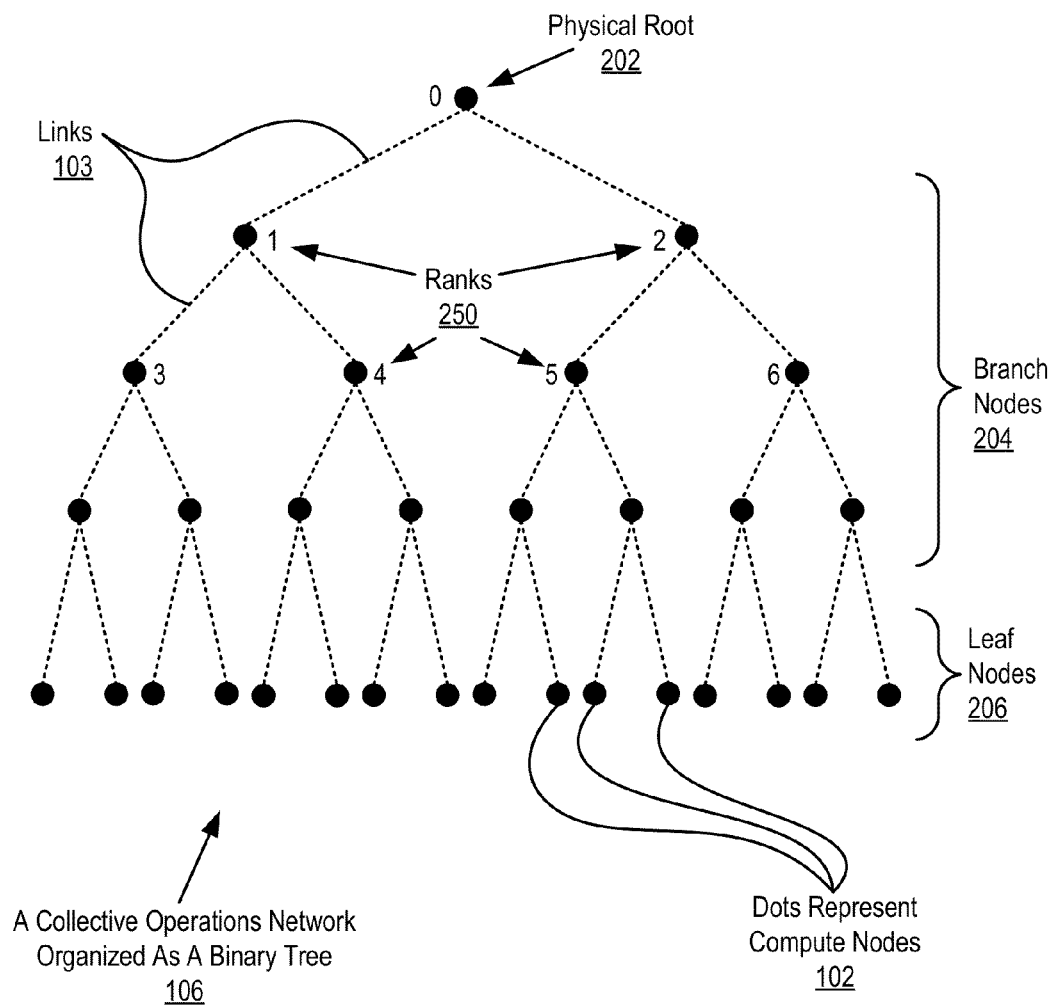
FIG. 5 illustrates an example data communications network optimized for collective operations by organizing compute nodes in a tree for use in parallel computers that implement endpoint-based parallel data processing in a PAMI according to embodiments of the present invention.

For further explanation, FIG. 5 illustrates an example data communications network (106) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in parallel computers that implement endpoint-based parallel data processing in a PAMI according to embodiments of the present invention may contain only a few compute nodes or hundreds or thousands of compute nodes.

In the example of FIG. 5, each node in the tree is assigned a unit identifier referred to as a 'rank' (250). The rank actually identifies an instance of a parallel application that is executing on a compute node. That is, the rank is an application-level identifier. Using the rank to identify a node assumes that only one such instance of an application is executing on each node. A compute node can, however, support multiple processors, each of which can support multiple processing cores—so that more than one process or instance of an application can easily be present under execution on any given compute node—or in all the compute nodes, for that matter. To the extent that more than one instance of an application executes on a single compute node, the rank identifies the instance of the application as such rather than the compute node. A rank uniquely identifies an application's location in the tree network for use in both point-to-point and collective operations in the tree network. The ranks in this example are assigned as integers beginning with '0' assigned to the root instance or root node (202), '1' assigned to the first node in the second layer of the tree, '2' assigned to the second node in the second layer of the tree, '3' assigned to the first node in the third layer of the tree, '4' assigned to the second node in the third layer of the tree, and so on. For ease of illustration, only the ranks of the first three layers of the tree are shown here, but all compute nodes, or rather all application instances, in the tree network are assigned a unique rank. Such rank values can also be assigned as identifiers of application instances as organized in a mesh or torus network.

Figure 6:
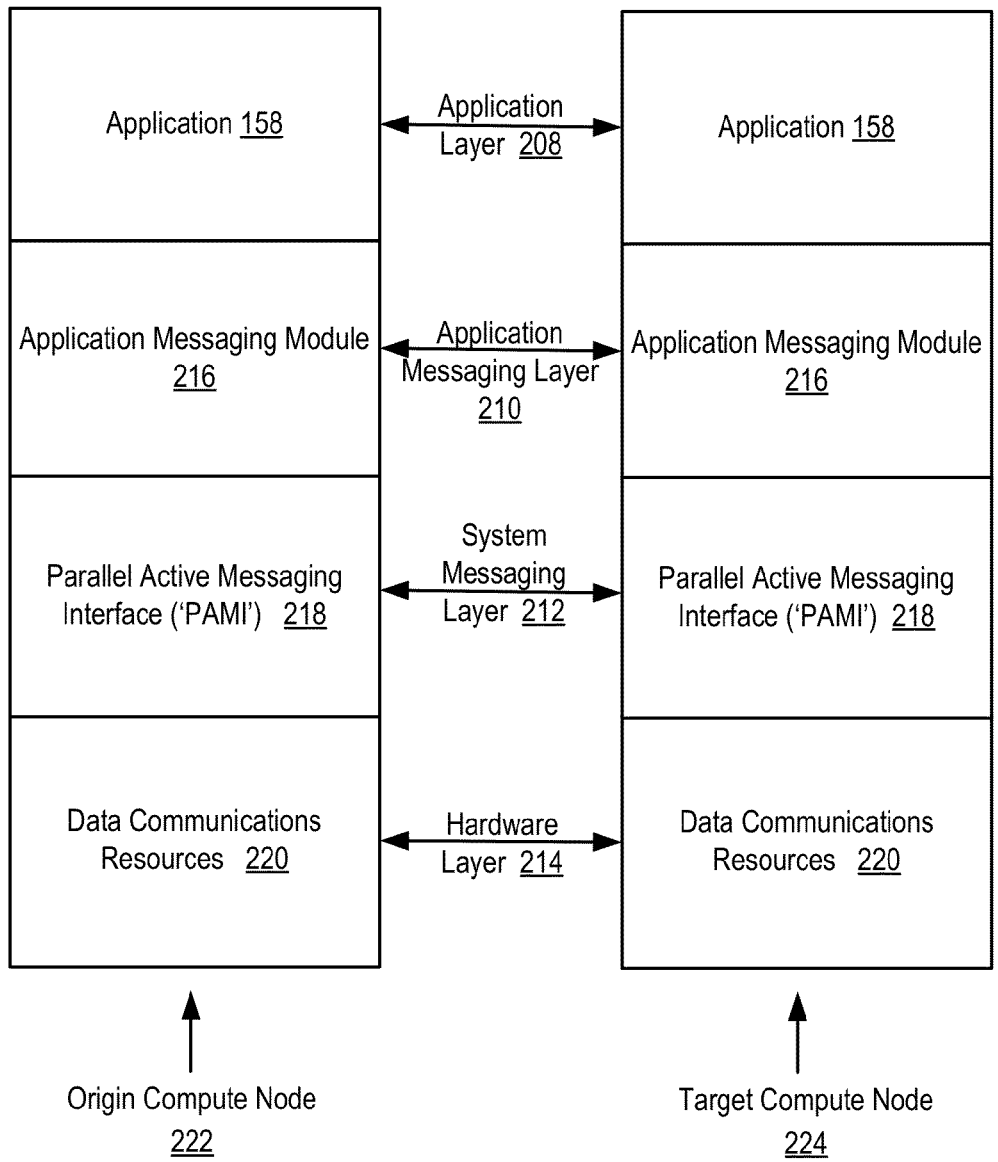
FIG. 6 sets forth a block diagram of an example protocol stack for use in parallel computers that implement endpoint-based parallel data processing in a PAMI according to embodiments of the present invention.

For further explanation, FIG. 6 sets forth a block diagram of an example protocol stack useful in parallel computers that implement endpoint-based parallel data processing in a PAMI according to embodiments of the present invention. The example protocol stack of FIG. 6 includes a hardware layer (214), a system messaging layer (212), an application messaging layer (210), and an application layer (208). For ease of explanation, the protocol layers in the example stack of FIG. 6 are shown connecting an origin compute node (222) and a target compute node (224), although it is worthwhile to point out that in embodiments that effect DMA data transfers, the origin compute node and the target compute node can be the same compute node. The granularity of connection through the system messaging layer (212), which is implemented with a PAMI (218), is finer than merely compute node to compute node—because, again, communications among endpoints often is communications among endpoints on the same compute node. For further explanation, recall that the PAMI (218) connects endpoints, connections specified by combinations of clients, contexts, and tasks, each such combination being specific to a thread of execution on a compute node, with each compute node capable of supporting many threads and therefore many endpoints. Every endpoint typically can function as both an origin endpoint or a target endpoint for data transfers through a PAMI, and both the origin endpoint and its target endpoint can be located on the same compute node. So an origin compute node (222) and its target compute node (224) can in fact, and often will, be the same compute node.

The application layer (208) provides communications among instances of a parallel application (158) running on the compute nodes (222, 224) by invoking functions in an application messaging module (216) installed on each compute node. Communications among instances of the application through messages passed between the instances of the application. Applications may communicate messages invoking function of an application programming interface ('API') exposed by the application messaging module (216). In this approach, the application messaging module (216) exposes a traditional interface, such as an API of an MPI library, to the application program (158) so that the application program can gain the benefits of a PAMI, reduced network traffic, callback functions, and so on, with no need to recode the application. Alternatively, if the parallel application is programmed to use PAMI functions, the application can call the PAMI functions directly, without going through the application messaging module.

The example protocol stack of FIG. 6 includes a system messaging layer (212) implemented here as a PAMI (218). The PAMI provides system-level data communications functions that support messaging in the application layer (208) and the application messaging layer (210). Such system-level functions are typically invoked through an API exposed to the application messaging modules (216) in the application messaging layer (210). Although developers can in fact access a PAMI API directly by coding an application to do so, a PAMI's system-level functions in the system messaging layer (212) in many embodiments are isolated from the application layer (208) by the application messaging layer (210), making the application layer somewhat independent of system specific details. With an application messaging module presenting a standard MPI API to an application, for example, with the application messaging module retooled to use the PAMI to carry out the low-level messaging functions, the application gains the benefits of a PAMI with no need to incur the expense of reprogramming the application to call the PAMI directly. Because, however, some applications will in fact be reprogrammed to call the PAMI directly, all entities in the protocol stack above the PAMI are viewed by PAMI as applications. When PAMI functions are invoked by entities above the PAMI in the stack, the PAMI makes no distinction whether the caller is in the application layer or the application messaging layer, no distinction whether the caller is an application as such or an MPI library function invoked by an application. As far as the PAMI is concerned, any caller of a PAMI function is an application.

The protocol stack of FIG. 6 includes a hardware layer (214) that defines the physical implementation and the electrical implementation of aspects of the hardware on the compute nodes such as the bus, network cabling, connector types, physical data rates, data transmission encoding and many other factors for communications between the compute nodes (222) on the physical network medium. In parallel computers that implement endpoint-based parallel data processing with DMA controllers according to embodiments of the present invention, the hardware layer includes DMA controllers and network links, including routers, packet switches, and the like.

Figure 7:
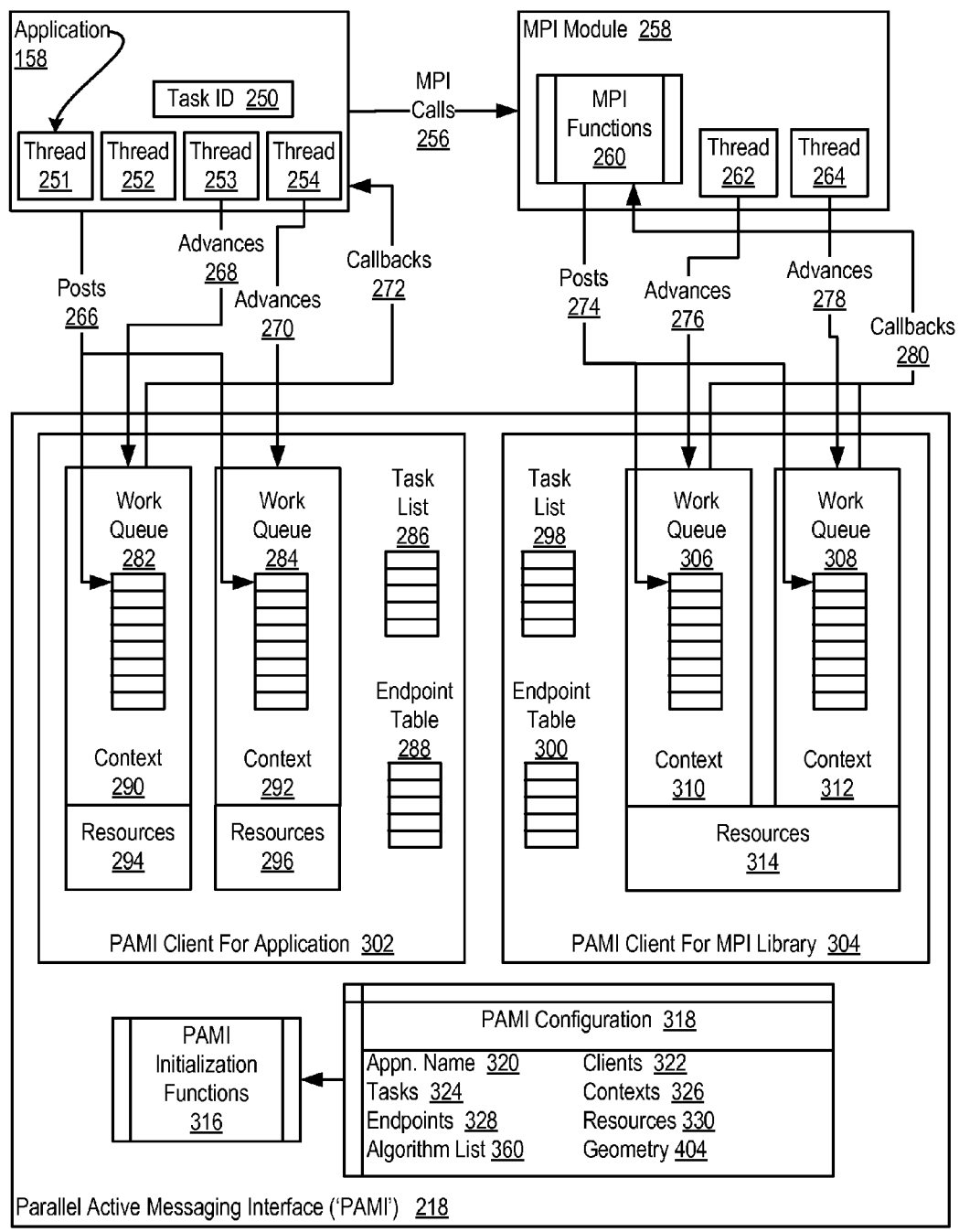
FIG. 7 sets forth a functional block diagram of an example PAMI for use in parallel computers that implement endpoint-based parallel data processing in a PAMI according to embodiments of the present invention.

For further explanation, FIG. 7 sets forth a functional block diagram of an example PAMI (218) for use in parallel computers that implement endpoint-based parallel data processing in a PAMI according to embodiments of the present invention. The PAMI (218) provides an active messaging layer that supports both point to point communications in a mesh or torus as well as collective operations, gathers, reductions, barriers, and the like in tree networks, for example. The PAMI is a multithreaded parallel communications engine designed to provide low level message passing functions, many of which are one-sided, and abstract such functions for higher level messaging middleware, referred to in this specification as 'application messaging modules' in an application messaging layer. In the example of FIG. 7, the application messaging layer is represented by a generic MPI module (258), appropriate for ease of explanation because some form of MPI is a de facto standard for such messaging middleware. Compute nodes and communications endpoints of a parallel computer (102 on FIG. 1) are coupled for data communications through such a PAMI and through data communications resources (294, 296, 314) that include DMA controllers, network adapters, and data communications networks through which controllers and adapters deliver data communications.

The PAMI (218) provides data communications among data communications endpoints, where each endpoint is specified by data communications parameters for a thread of execution on a compute node, including specifications of a client, a context, and a task. In the particular example of FIG. 10, application (158) has mapped thread (251) to advance work on context (290) of endpoint (338), and the combination of client (302), task (332), and context (290) effectively specify data communications parameters for thread (251). Similarly, application (158) has mapped thread (252) to advance work on context (292) of endpoint (340), and the combination of client (303), task (333), and context (292) effectively specify data communications parameters for thread (252). Application (157) has mapped thread (253) to advance work on context (310) of endpoint (342), and the combination of client (304), task (334), and context (310) effectively specify data communications parameters for thread (253). And application (159) has mapped thread (254) to advance work on context (312) of endpoint (344), and the combination of client (305), task (336), and context (312) effectively specify data communications parameters for thread (254). In these examples, a separate thread is assigned to advance work on each context of an endpoint, but that is not a requirement of the invention. In embodiments, one thread can advance work on more than one context or endpoint, and more than one thread can be permitted to post work to a same context of an endpoint.

The PAMI (218) in this example includes PAMI clients (302, 304), tasks (286, 298), contexts (290,292,310,312), and endpoints (288, 300). A PAMI client is a collection of data communications resources (294, 296, 314) dedicated to the exclusive use of an application-level data processing entity, an application or an application messaging module such as an MPI library. Data communications resources assigned in collections to PAMI clients are explained in more detail below with reference to FIGS. 8A and 8B. PAMI clients (302, 304 on FIG. 7) enable higher level middleware, application messaging modules, MPI libraries, and the like, to be developed independently so that each can be used concurrently by an application. Although the application messaging layer in FIG. 7 is represented for example by a single generic MPI module (258), in fact, a PAMI, operating multiple clients, can support multiple message passing libraries or application messaging modules simultaneously, a fact that is explained in more detail with reference to FIG. 9. FIG. 9 sets forth a functional block diagram of an example PAMI (218) useful in parallel computers that implement endpoint-based parallel data processing in a PAMI according to embodiments of the present invention in which the example PAMI operates, on behalf of an application (158), with multiple application messaging modules (502-510) simultaneously. The application (158) can have multiple messages in transit simultaneously through each of the application messaging modules (502-510). Each context (512-520) carries out, through post and advance functions, data communications for the application on data communications resources in the exclusive possession, in each client, of that context. Each context carries out data communications operations independently and in parallel with other contexts in the same or other clients. In the example FIG. 9, each client (532-540) includes a collection of data communications resources (522-530) dedicated to the exclusive use of an application-level data processing entity, one of the application messaging modules (502-510):

IBM MPI Library (502) operates through context (512) data communications resources (522) dedicated to the use of PAMI client (532), MPICH Library (504) operates through context (514) data communications resources (524) dedicated to the use of PAMI client (534), Unified Parallel C ('UPC') Library (506) operates through context (516) data communications resources (526) dedicated to the use of PAMI client (536), Partitioned Global Access Space ('PGAS') Runtime Library (508) operates through context (518) data communications resources (528) dedicated to the use of PAMI client (538), and Aggregate Remote Memory Copy Interface ('ARMCI') Library (510) operates through context (520) data communications resources (530) dedicated to the use of PAMI client (540).

Again referring to the example of FIG. 7: The PAMI (218) includes tasks, listed in task lists (286, 298) and identified (250) to the application (158). A 'task' as the term is used in PAMI operations is a platform-defined integer datatype that identifies a canonical application process, an instance of a parallel application (158). Very carefully in this specification, the term 'task' is always used to refer only to this PAMI structure, not the traditional use of the computer term 'task' to refer to a process or thread of execution. In this specification, the term 'process' refers to a canonical data processing process, a container for threads in a multithreading environment. In particular in the example of FIG. 7, the application (158) is implemented as a canonical process with multiple threads (251-254) assigned various duties by a leading thread (251) which itself executes an instance of a parallel application program. Each instance of a parallel application is assigned a task; each task so assigned can be an integer value, for example, in a C environment, or a separate task object in a C++ or Java environment. The tasks are components of communications endpoints, but are not themselves communications endpoints; tasks are not addressed directly for data communications in PAMI. This gives a finer grained control than was available in prior message passing art. Each client has its own list (286, 298) of tasks for which its contexts provide services; this allows each process to potentially reside simultaneously in two or more different communications domains as will be the case in certain advanced computers using, for example, one type of processor and network in one domain and a completely different processor type and network in another domain, all in the same computer.

The PAMI (218) includes contexts (290, 292, 310, 312). A 'context' as the term is used in PAMI operations is composed of a subset of a client's collection of data processing resources, context functions, and a work queue of data transfer instructions to be performed by use of the subset through the context functions operated by an assigned thread of execution. That is, a context represents a partition of the local data communications resources assigned to a PAMI client. Every context within a client has equivalent functionality and semantics. Context functions implement contexts as threading points that applications use to optimize concurrent communications. Communications initiated by a local process, an instance of a parallel application, uses a context object to identify the specific threading point that will be used to issue a particular communication independent of communications occurring in other contexts. In the example of FIG. 7, where the application (158) and the application messaging module (258) are both implemented as canonical processes with multiple threads of execution, each has assigned or mapped particular threads (253, 254, 262, 264) to advance (268, 270, 276, 278) work on the contexts (290, 292, 310, 312), including execution of local callbacks (272, 280). In particular, the local event callback functions (272, 280) associated with any particular communication are invoked by the thread advancing the context that was used to initiate the communication operation in the first place. Like PAMI tasks, contexts are not used to directly address a communication destination or target, as they are a local resource.

Context functions, explained here with regard to references (472-482) on FIG. 9, include functions to create (472) and destroy (474) contexts, functions to lock (476) and unlock (478) access to a context, and functions to post (480) and advance (480) work in a context. For ease of explanation, the context functions (472-482) are illustrated in only one expanded context (512); readers will understand, however, that all PAMI contexts have similar context functions. The create (472) and destroy (474) functions are, in an object-oriented sense, constructors and destructors. In the example embodiments described in this specifications, post (480) and advance (482) functions on a context are critical sections, not thread safe. Applications using such non-reentrant functions must somehow ensure that critical sections are protected from re-entrant use. Applications can use mutual exclusion locks to protect critical sections. The lock (476) and unlock (478) functions in the example of FIG. 9 provide and operate such a mutual exclusion lock to protect the critical sections in the post (480) and advance (482) functions. If only a single thread posts or advances work on a context, then that thread need never lock that context. To the extent that progress is driven independently on a context by a single thread of execution, then no mutual exclusion locking of the context itself is required—provided that no other thread ever attempts to call a function on such a context. If more than one thread will post or advance work on a context, each such thread must secure a lock before calling a post or an advance function on that context. This is one reason why it is probably a preferred architecture, given sufficient resources, to assign one thread to operate each context. Progress can be driven with advance (482) functions concurrently among multiple contexts by using multiple threads, as desired by an application—shown in the example of FIG. 7 by threads (253, 254, 262, 264) which advance work concurrently, independently and in parallel, on contexts (290, 292, 310, 312).

Posts and advances (480, 482 on FIG. 9) are functions called on a context, either in a C-type function with a context ID as a parameter, or in object oriented practice where the calling entity possesses a reference to a context or a context object as such and the posts and advances are member methods of a context object. Again referring to FIG. 7: Application-level entities, application programs (158) and application messaging modules (258), post (266, 274) data communications instructions, including SENDs, RECEIVEs, PUTs, GETs, and so on, to the work queues (282, 284, 306, 308) in contexts and then call advance functions (268, 270, 276, 278) on the contexts to progress specific data processing and data communications that carry out the instructions. The data processing and data communications effected by the advance functions include specific messages, request to send ('RTS') messages, acknowledgments, callback execution, transfers of transfer data or payload data, and so on. Advance functions therefore operate generally by checking a work queue for any new instructions that need to be initiated and checking data communications resources for any incoming message traffic that needs to be administered as well as increases in storage space available for outgoing message traffic, with callbacks and the like. Advance functions also carry out or trigger transfers of transfer data or payload data.

In at least some embodiments, a context's subset of a client's data processing resources is dedicated to the exclusive use of the context. In the example of FIG. 7, context (290) has a subset (294) of a client's (302) data processing resources dedicated to the exclusive use of the context (290), and context (292) has a subset (296) of a client's (302) data processing resources dedicated to the exclusive use of the context (292). Advance functions (268, 270) called on contexts (290, 292) therefore never need to secure a lock on a data communications resource before progressing work on a context—because each context (290, 292) has exclusive use of dedicated data communications resources. Usage of data communications resources in this example PAMI (218), however, is not thread-safe. When data communications resources are shared among contexts, mutual exclusion locks are needed. In contrast to the exclusive usage of resources by contexts (290, 292), contexts (310, 312) share access to their client's data communications resource (314) and therefore do not have data communications resources dedicated to exclusive use of a single context. Contexts (310, 312) therefore always must secure a mutual exclusion lock on a data communications resource before using the resource to send or receive administrative messages or transfer data.

For further explanation, here is an example pseudocode Hello World program for an application using a PAMI:

```
int main(int argc, char ** argv)
{
    PAMI_client_t client;
    PAMI_context_t context;
    PAMI_result_t status = PAMI_ERROR;
    const char *name = "PAMI";
    status  = PAMI_Client_initialize(name, &client);
    size_t _n = 1;
    status  = PAMI_Context_createv(client, NULL, 0, &context, _n);
    PAMI_configuration_t configuration;
    configuration.name = PAMI_TASK_ID;
    status = PAMI_Configuration_query(client, &configuration);
    size_t task_id = configuration.value.intval;
    configuration.name = PAMI_NUM_TASKS;
    status = PAMI_Configuration_query(client, &configuration);
    size_t num_tasks = configuration.value.intval;
```

-continued

```
    fprintf (stderr, "Hello process %d of %d\n", task_id, num_tasks);
    status = PAMI_Context_destroy(context);
    status = PAMI_Client_finalize(client);
    return 0;
}
```

This short program is termed 'pseudocode' because it is an explanation in the form of computer code, not a working model, not an actual program for execution. In this pseudocode example, an application initializes a client and a context for an application named "PAMI." PAMI_Client_initialize and PAMI_Context_createv are initialization functions (316) exposed to applications as part of a PAMI's API. These functions, in dependence upon the application name "PAMI," pull from a PAMI configuration (318) the information needed to establish a client and a context for the application. The application uses this segment:

```
PAMI_configuration_t configuration;
configuration.name = PAMI_TASK_ID;
status = PAMI_Configuration_query(client, &configuration);
size_t task_id = configuration.value.intval;
``` to retrieve its task ID and this segment:

```
configuration.name = PAMI_NUM_TASKS;
status = PAMI_Configuration_query(client, &configuration);
size_t num_tasks = configuration.value.intval;
``` to retrieve the number of tasks presently configured to carry out parallel communications and implement endpoint-based parallel data processing in the PAMI. The applications prints "Hello process task_id of num_tasks," where task_id is the task ID of the subject instance of a parallel application, and num_tasks is the number of instances of the application executing in parallel on compute nodes. Finally, the application destroys the context and terminates the client.

Figure 8A:
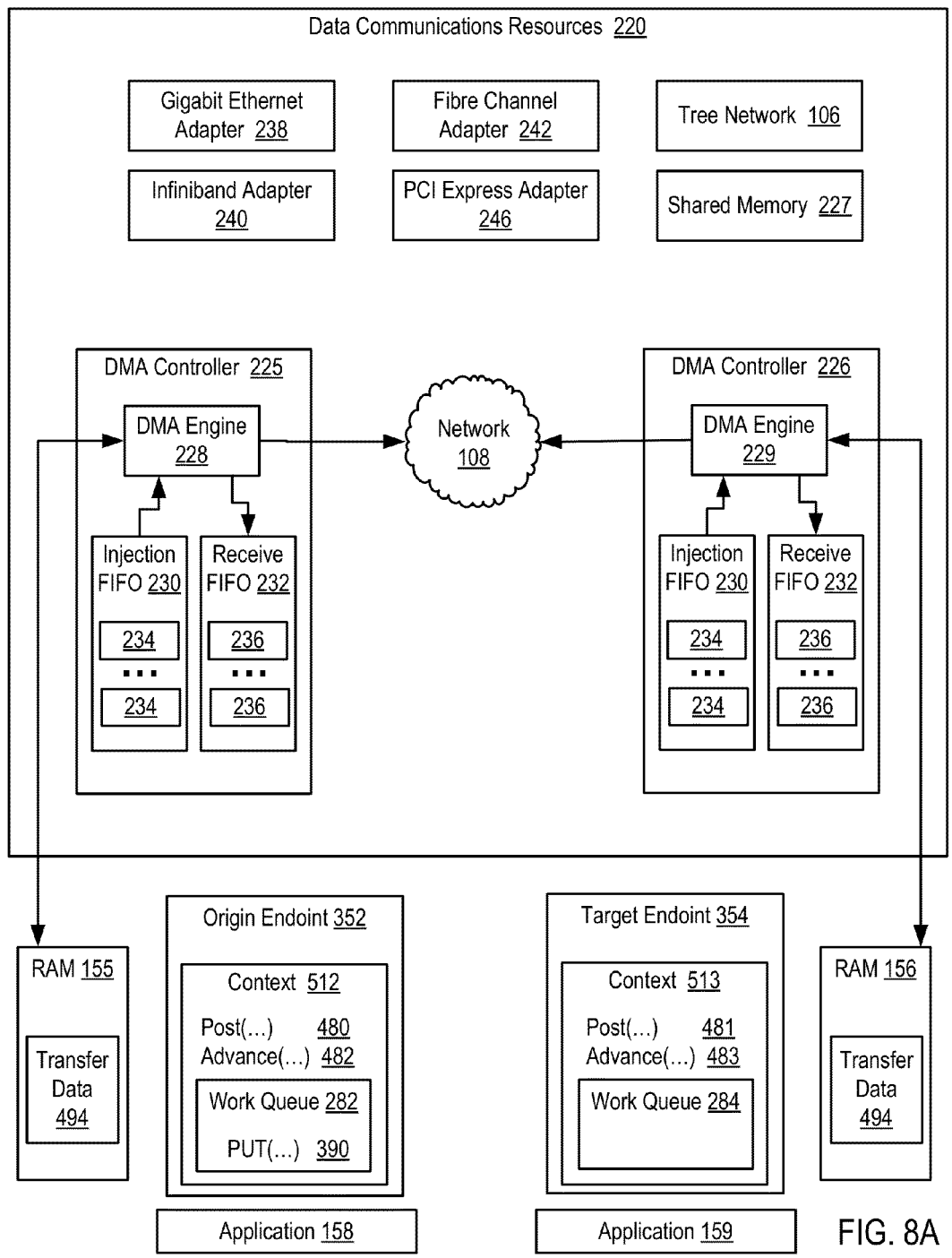
FIG. 8A sets forth a functional block diagram of example data communications resources for use in parallel computers that implement endpoint-based parallel data processing in a PAMI according to embodiments of the present invention.
Figure 9:
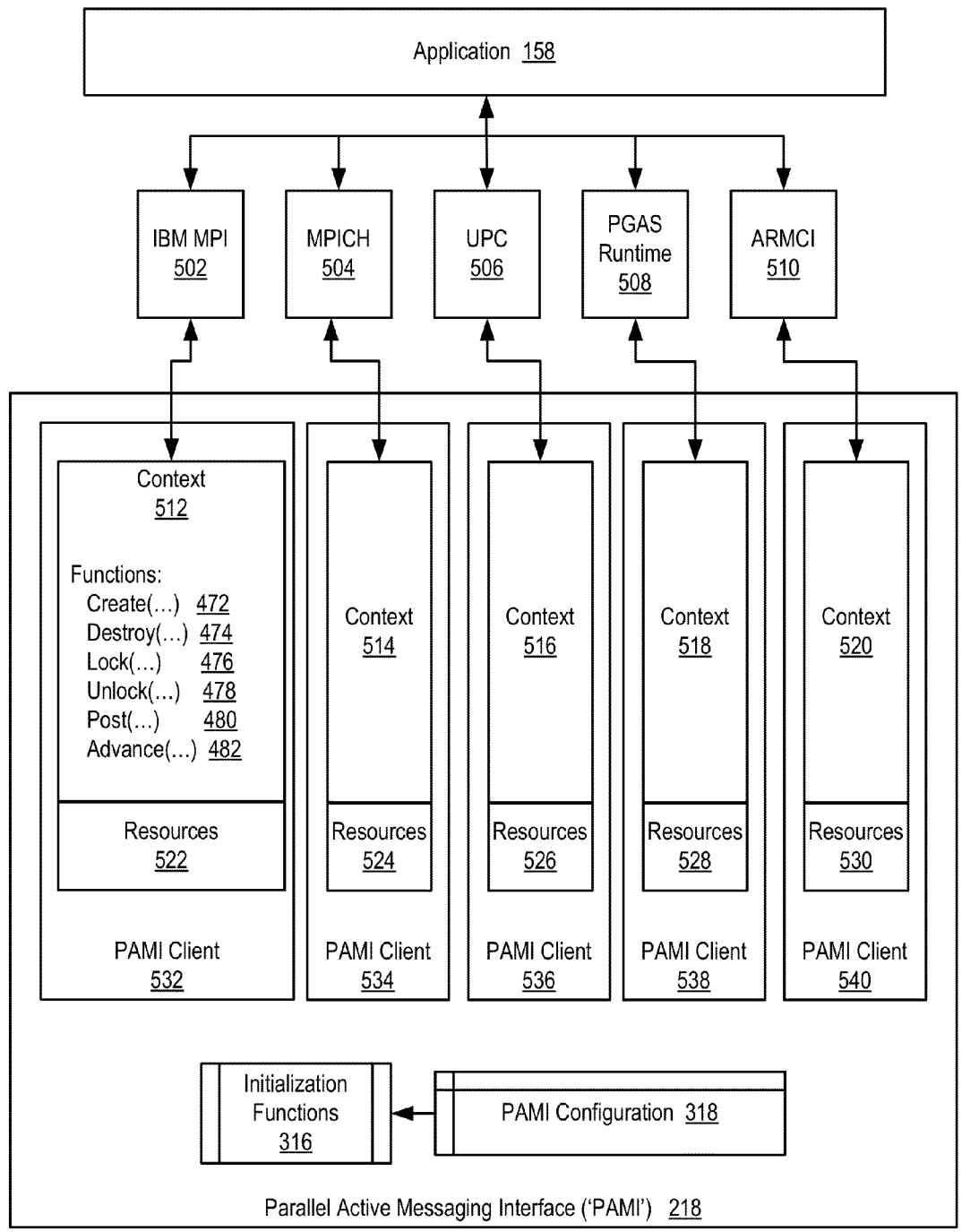
FIG. 9 sets forth a functional block diagram of an example PAMI for use in parallel computers that implement endpoint-based parallel data processing in a PAMI according to embodiments of the present invention.

For further explanation of data communications resources assigned in collections to PAMI clients, FIG. 8A sets forth a block diagram of example data communications resources (220) useful in parallel computers that implement endpoint-based parallel data processing in a PAMI according to embodiments of the present invention. The data communications resources of FIG. 8A include a gigabit Ethernet adapter (238), an Infiniband adapter (240), a Fibre Channel adapter (242), a PCI Express adapter (246), a collective operations network configured as a tree (106), shared memory (227), DMA controllers (225, 226), and a network (108) configured as a point-to-point torus or mesh like the network described above with reference to FIG. 4. A PAMI is configured with clients, each of which is in turn configured with certain collections of such data communications resources—so that, for example, the PAMI client (302) in the PAMI (218) in the example of FIG. 7 can have dedicated to its use a collection of data communications resources composed of six segments (227) of shared memory, six Gigabit Ethernet adapters (238), and six Infiniband adapters (240). And the PAMI client (304) can have dedicated to its use six Fibre Channel adapters (242), a DMA controller (225), a torus network (108), and five segments (227) of shared memory. And so on.

The DMA controllers (225, 226) in the example of FIG. 8A each is configured with DMA control logic in the form of a DMA engine (228, 229), an injection FIFO buffer (230), and a receive FIFO buffer (232). The DMA engines (228, 229) can be implemented as hardware components, logic networks of a DMA controller, in firmware, as software operating an embedded controller, as various combinations of software, firmware, or hardware, and so on. Each DMA engine (228, 229) operates on behalf of endpoints to send and receive DMA transfer data through the network (108). The DMA engines (228, 229) operate the injection buffers (230, 232) by processing first-in-first-out descriptors (234, 236) in the buffers, hence the designation 'injection FIFO' and 'receive FIFO.'

For further explanation, here is an example use case, a description of the overall operation of an example PUT DMA transfer using the DMA controllers (225, 226) and network (108) in the example of FIG. 8A: An originating application (158), which is typically one instance of a parallel application running on a compute node, places a quantity of transfer data (494) at a location in its RAM (155). The application (158) then calls a post function (480) on a context (512) of an origin endpoint (352), posting a PUT instruction (390) into a work queue (282) of the context (512); the PUT instruction (390) specifies a target endpoint (354) to which the transfer data is to be sent as well as source and destination memory locations. The application then calls an advance function (482) on the context (512). The advance function (482) finds the new PUT instruction in its work queue (282) and inserts a data descriptor (234) into the injection FIFO of the origin DMA controller (225); the data descriptor includes the source and destination memory locations and the specification of the target endpoint. The origin DMA engine (225) then transfers the data descriptor (234) as well as the transfer data (494) through the network (108) to the DMA controller (226) on the target side of the transaction. The target DMA engine (229), upon receiving the data descriptor and the transfer data, places the transfer data (494) into the RAM (156) of the target application at the location specified in the data descriptor and inserts into the target DMA controller's receive FIFO (232) a data descriptor (236) that specifies the target endpoint and the location of the transfer data (494) in RAM (156). The target application (159) or application instance calls an advance function (483) on a context (513) of the target endpoint (354). The advance function (483) checks the communications resources assigned to its context (513) for incoming messages, including checking the receive FIFO (232) of the target DMA controller (226) for data descriptors that specify the target endpoint (354). The advance function (483) finds the data descriptor for the PUT transfer and advises the target application (159) that its transfer data has arrived. A GET-type DMA transfer works in a similar manner, with some differences, including, of course, the fact that transfer data flows in the opposite direction. Similarly, typical SEND transfers also operate similarly, some with rendezvous protocols, some with eager protocols, with data transmitted in packets over the a network through non-DMA network adapters or through DMA controllers.

Figure 8B:
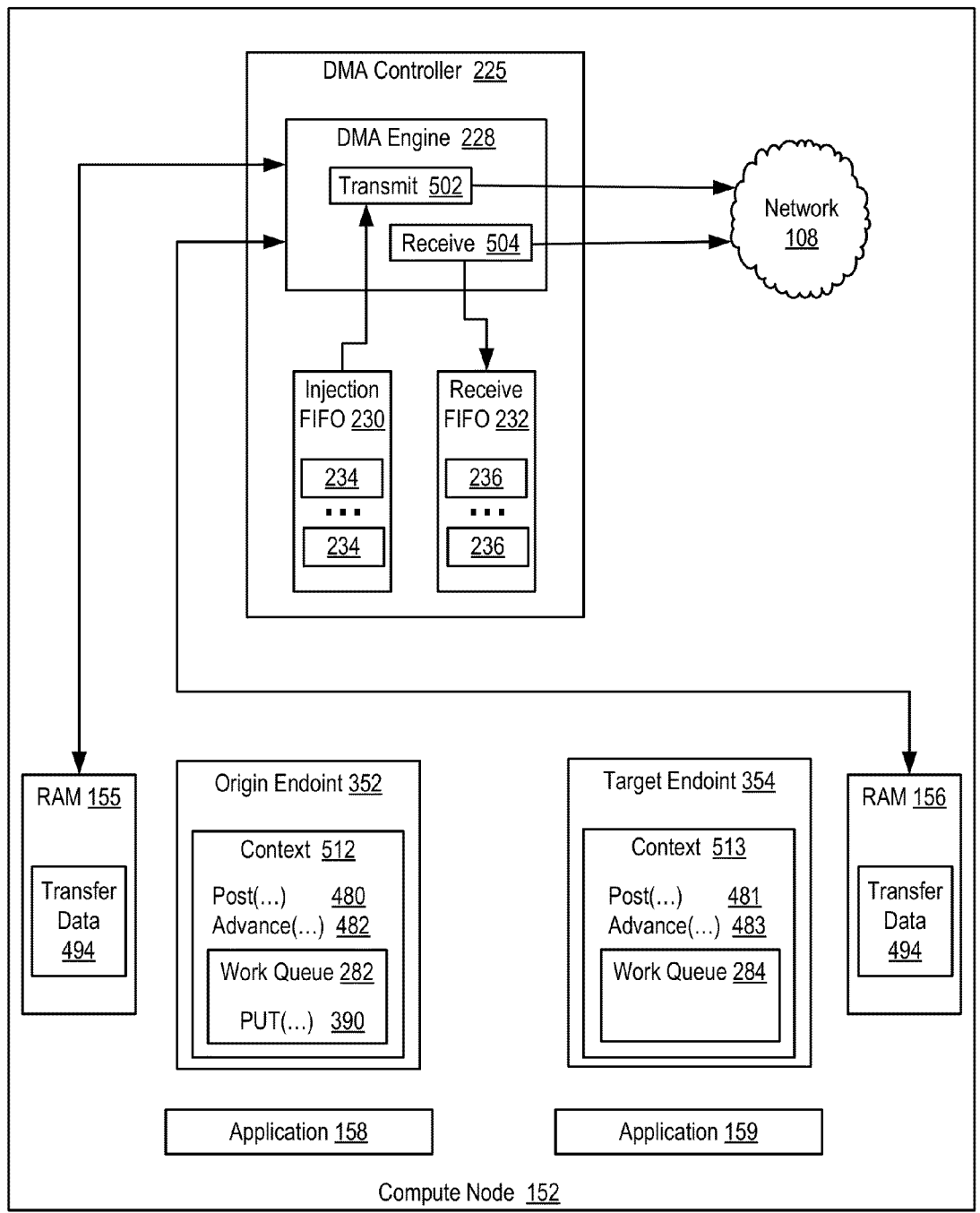
FIG. 8B sets forth a functional block diagram of an example DMA controller—in an architecture where the DMA controller is the only DMA controller on a compute node—and an origin endpoint and its target endpoint are both located on the same compute node.

The example of FIG. 8A includes two DMA controllers (225, 226). DMA transfers between endpoints on separate compute nodes use two DMA controllers, one on each compute node. Compute nodes can be implemented with multiple DMA controllers so that many or even all DMA transfers even among endpoints on a same compute node can be carried out using two DMA engines. In some embodiments at least, however, a compute node, like the example compute node (152) of FIG. 2, has only one DMA engine, so that that DMA engine can be use to conduct both sides of transfers between endpoints on that compute node. For further explanation of this fact, FIG. 8B sets forth a functional block diagram of an example DMA controller (225) operatively coupled to a network (108)—in an architecture where this DMA controller (225) is the only DMA controller on a compute node—and an origin endpoint (352) and its target endpoint (354) are both located on the same compute node (152). In the example of FIG. 8B, a single DMA engine (228) operates with two threads of execution (502, 504) on behalf of endpoints (352, 354) on a same compute node to send and receive DMA transfer data through a segment (227) of shared memory. A transmit thread (502) injects transfer data into the network (108) as specified in data descriptors (234) in an injection FIFO buffer (230), and a receive thread (502) receives transfer data from the network (108) as specified in data descriptors (236) in a receive FIFO buffer (232).

The overall operation of an example PUT DMA transfer with the DMA controllers (225) and the network (108) in the example of FIG. 8B is: An originating application (158), that is actually one of multiple instances (158, 159) of a parallel application running on a compute node (152) in separate threads of execution, places a quantity of transfer data (494) at a location in its RAM (155). The application (158) then calls a post function (480) on a context (512) of an origin endpoint (352), posting a PUT instruction (390) into a work queue (282) of the context (512); the PUT instruction specifies a target endpoint (354) to which the transfer data is to be sent as well as source and destination memory locations. The application (158) then calls an advance function (482) on the context (512). The advance function (482) finds the new PUT instruction (390) in its work queue (282) and inserts a data descriptor (234) into the injection FIFO of the DMA controller (225); the data descriptor includes the source and destination memory locations and the specification of the target endpoint. The DMA engine (225) then transfers by its transmit and receive threads (502, 504) through the network (108) the data descriptor (234) as well as the transfer data (494). The DMA engine (228), upon receiving by its receive thread (504) the data descriptor and the transfer data, places the transfer data (494) into the RAM (156) of the target application and inserts into the DMA controller's receive FIFO (232) a data descriptor (236) that specifies the target endpoint and the location of the transfer data (494) in RAM (156). The target application (159) calls an advance function (483) on a context (513) of the target endpoint (354). The advance function (483) checks the communications resources assigned to its context for incoming messages, including checking the receive FIFO (232) of the DMA controller (225) for data descriptors that specify the target endpoint (354). The advance function (483) finds the data descriptor for the PUT transfer and advises the target application (159) that its transfer data has arrived. Again, a GET-type DMA transfer works in a similar manner, with some differences, including, of course, the fact that transfer data flows in the opposite direction. And typical SEND transfers also operate similarly, some with rendezvous protocols, some with eager protocols, with data transmitted in packets over the a network through non-DMA network adapters or through DMA controllers.

By use of an architecture like that illustrated and described with reference to FIG. 8B, a parallel application or an application messaging module that is already programmed to use DMA transfers can gain the benefit of the speed of DMA data transfers among endpoints on the same compute node with no need to reprogram the applications or the application messaging modules to use the network in other modes. In this way, an application or an application messaging module, already programmed for DMA, can use the same DMA calls through a same API for DMA regardless whether subject endpoints are on the same compute node or on separate compute nodes.

Figure 10:
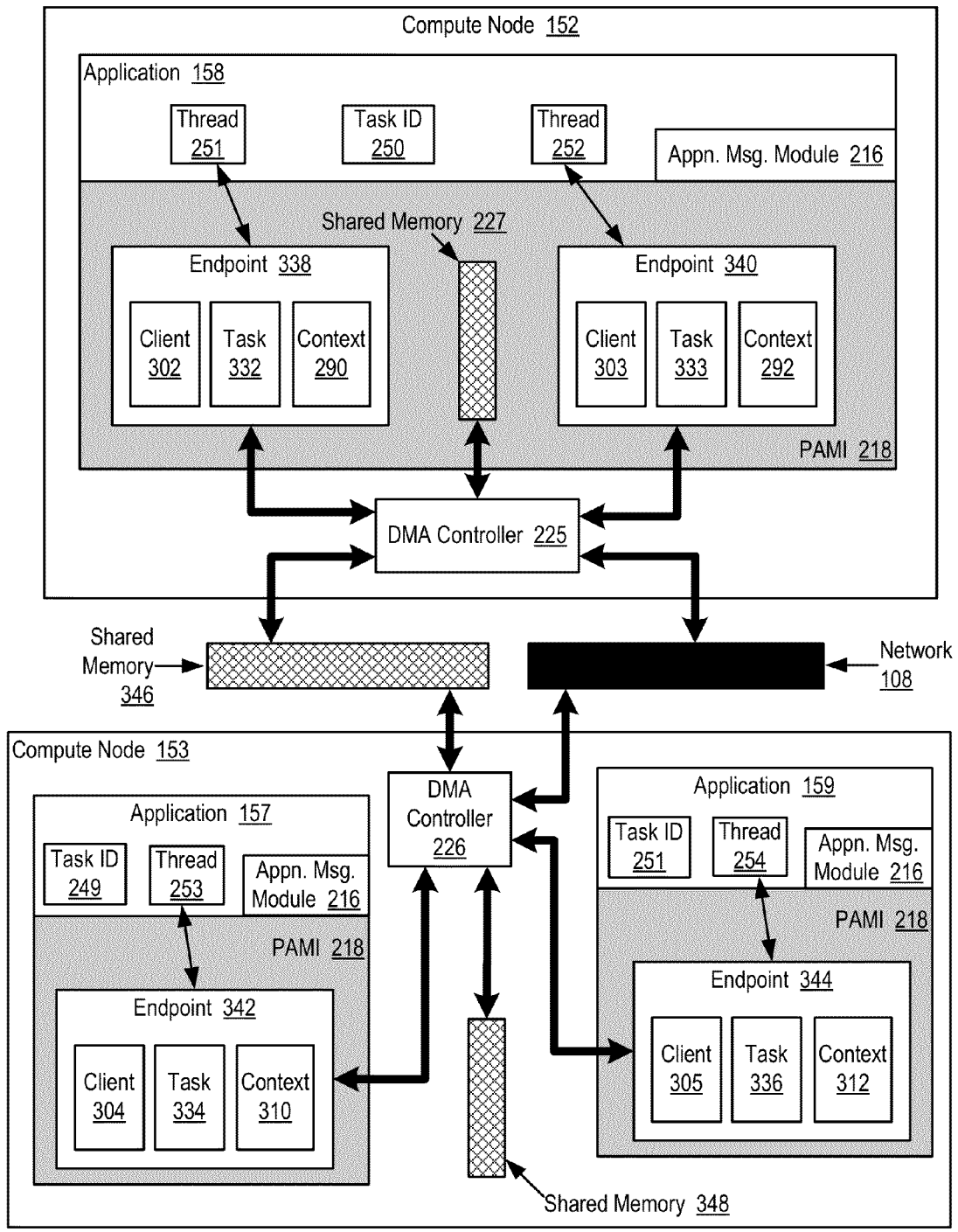
FIG. 10 sets forth a functional block diagram of example endpoints for use in parallel computers that implement endpoint-based parallel data processing in a PAMI according to embodiments of the present invention.

For further explanation, FIG. 10 sets forth a functional block diagram of example endpoints useful in parallel computers that implement endpoint-based parallel data processing in a PAMI according to embodiments of the present invention. In the example of FIG. 10, a PAMI (218) is implemented with instances on two separate compute nodes (152, 153) that include four endpoints (338, 340, 342, 344). These endpoints are opaque objects used to address an origin or destination in a process and are constructed from a (client, task, context) tuple. Non-DMA SEND and RECEIVE instructions as well as DMA instructions such as PUT and GET address a destination by use of an endpoint object or endpoint identifier.

Each endpoint (338, 340, 342, 344) in the example of FIG. 10 is composed of a client (302, 303, 304, 305), a task (332, 333, 334, 335), and a context (290, 292, 310, 312). Using a client a component in the specification of an endpoint disambiguates the task and context identifiers, as these identifiers may be the same for multiple clients. A task is used as a component in the specification of an endpoint to construct an endpoint to address a process accessible through a context. A context in the specification of an endpoint identifies, refers to, or represents the specific context associated with a destination or target task—because the context identifies a specific threading point on a task. A context offset identifies which threading point is to process a particular communications operation. Endpoints enable "crosstalk" which is the act of issuing communication on a local context with a particular context offset that is directed to a destination endpoint with no correspondence to a source context or source context offset.

For efficient utilization of storage in an environment where multiple tasks of a client reside on the same physical compute node, an application may choose to write an endpoint table (288, 300 on FIG. 7) in a segment of shared memory (227, 346, 348). It is the responsibility of the application to allocate such segments of shared memory and coordinate the initialization and access of any data structures shared between processes. This includes any endpoint objects which are created by one process or instance of an application and read by another process.

Endpoints (342, 344) on compute node (153) serve respectively two application instances (157, 159). The tasks (334, 336) in endpoints (342, 344) are different. The task (334) in endpoint (342) is identified by the task ID (249) of application (157), and the task (336) in endpoint (344) is identified by the task ID (251) of application (159). The clients (304, 305) in endpoints (342, 344) are different, separate clients. Client (304) in endpoint (342) associates data communications resources (e.g., 294, 296, 314 on FIG. 7) dedicated exclusively to the use of application (157), while client (305) in endpoint (344) associates data communications resources dedicated exclusively to the use of application (159). Contexts (310, 312) in endpoints (342, 344) are different, separate contexts. Context (310) in endpoint (342) operates on behalf of application (157) a subset of the data communications resources of client (304), and context (312) in endpoint (344) operates on behalf of application (159) a subset of the data communications resources of client (305).

Contrasted with the PAMIs (218) on compute node (153), the PAMI (218) on compute node (152) serves only one instance of a parallel application (158) with two endpoints (338, 340). The tasks (332, 333) in endpoints (338, 340) are the same, because they both represent a same instance of a same application (158); both tasks (332,333) therefore are identified, either with a same variable value, references to a same object, or the like, by the task ID (250) of application (158). The clients (302, 303) in endpoints (338, 340) are optionally either different, separate clients or the same client. If they are different, each associates a separate collection of data communications resources. If they are the same, then each client (302, 303) in the PAMI (218) on compute node (152) associates a same set of data communications resources and is identified with a same value, object reference, or the like. Contexts (290, 292) in endpoints (338, 340) are different, separate contexts. Context (290) in endpoint (338) operates on behalf of application (158) a subset of the data communications resources of client (302) regardless whether clients (302, 303) are the same client or different clients, and context (292) in endpoint (340) operates on behalf of application (158) a subset of the data communications resources of client (303) regardless whether clients (302, 303) are the same client or different clients. Thus the tasks (332, 333) are the same; the clients (302, 303) can be the same; and the endpoints (338, 340) are distinguished at least by different contexts (290, 292), each of which operates on behalf of one of the threads (251-252) of application (158), identified typically by a context offset or a threading point.

Endpoints (338, 340) being as they are on the same compute node (152) can effect DMA data transfers between endpoints (338, 340) through DMA controller (225) and a segment of shared local memory (227). In the absence of such shared memory (227), endpoints (338, 340) can effect DMA data transfers through the DMA controller (225) and the network (108), even though both endpoints (338, 340) are on the same compute node (152). DMA transfers between endpoint (340) on compute node (152) and endpoint (344) on another compute node (153) go through DMA controllers (225, 226) and either a network (108) or a segment of shared remote memory (346). DMA transfers between endpoint (338) on compute node (152) and endpoint (342) on another compute node (153) also go through DMA controllers (225, 226) and either a network (108) or a segment of shared remote memory (346).

The segment of shared remote memory (346) is a component of a Non-Uniform Memory Access ('NUMA') architecture, a segment in a memory module installed anywhere in the architecture of a parallel computer except on a local compute node. The segment of shared remote memory (346) is 'remote' in the sense that it is not installed on a local compute node. A local compute node is 'local' to the endpoints located on that particular compute node. The segment of shared remote memory (346), therefore, is 'remote' with respect to endpoints (338, 340) on compute node (152) if it is in a memory module on compute node (153) or anywhere else in the same parallel computer except on compute node (158).

Endpoints (342, 344) being as they are on the same compute node (153) can effect DMA data transfers between endpoints (342, 344) through DMA controller (226) and a segment of shared local memory (348). In the absence of such shared memory (348), endpoints (342, 344) can effect DMA data transfers through the DMA controller (226) and the network (108), even though both endpoints (342, 344) are on the same compute node (153). DMA transfers between endpoint (344) on compute node (153) and endpoint (340) on another compute node (152) go through DMA controllers (226, 225) and either a network (108) or a segment of shared remote memory (346). DMA transfers between endpoint (342) on compute node (153) and endpoint (338) on another compute node (152) go through DMA controllers (226, 225) and either a network (108) or a segment of shared remote memory (346). Again, the segment of shared remote memory (346) is 'remote' with respect to endpoints (342, 344) on compute node (153) if it is in a memory module on compute node (152) or anywhere else in the same parallel computer except on compute node (153).

Figure 11:
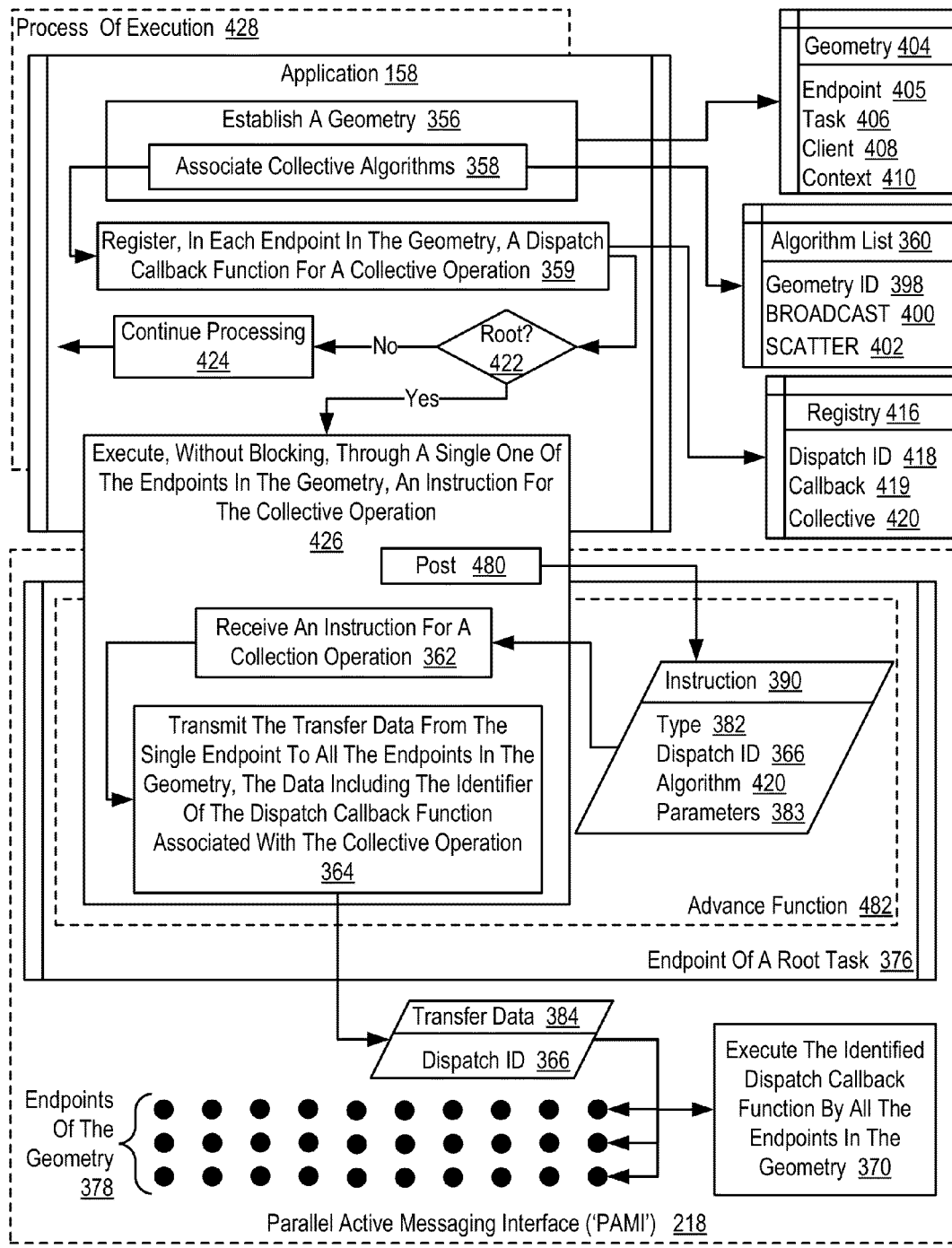
FIG. 11 sets forth a flow chart illustrating an example method of endpoint-based parallel data processing with non-blocking collective instructions in a PAMI of a parallel computer according to embodiments of the present invention.
Figure 12:
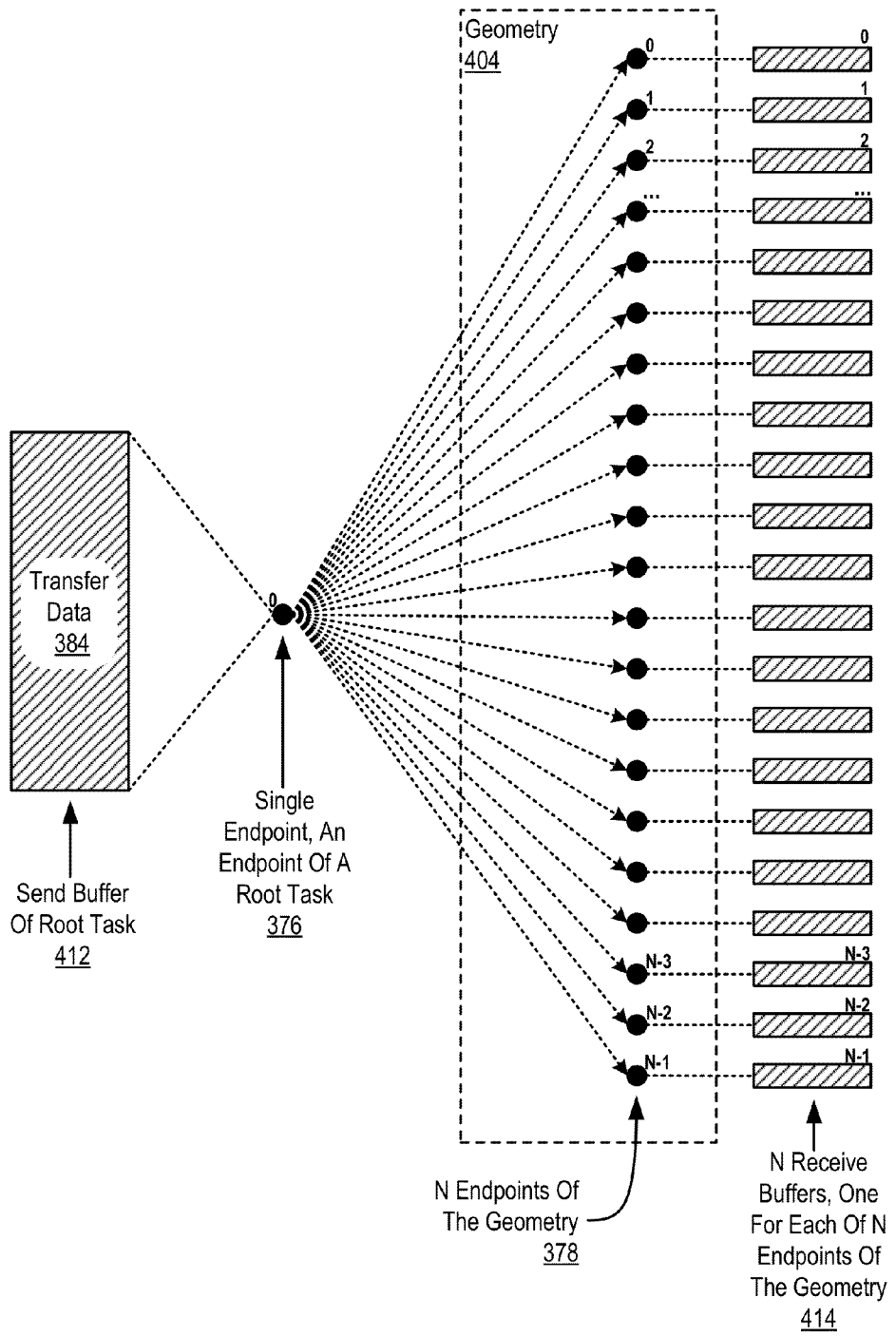
FIG. 12 sets forth a data flow diagram illustrating an example data flow effected according to the method of FIG. 11, with endpoint-based parallel data processing with non-blocking collective instructions in a PAMI of a parallel computer according to embodiments of the present invention.

For further explanation, FIG. 11 sets forth a flow chart illustrating an example method of endpoint-based parallel data processing in a PAMI of a parallel computer according to embodiments of the present invention. FIG. 12 sets forth a data flow diagram that illustrates an example data flow effected according to the method of FIG. 11. The method of FIG. 11 is described below in this specification, therefore, with reference both to FIG. 11 and also to FIG. 12, using reference numbers from both FIGS. 11 and 12.

The method of FIG. 11 is implemented in a PAMI (218) of a parallel computer composed of a number of compute nodes (102 on FIG. 1) that execute a parallel application, like those described above in this specification with reference to FIGS. 1-10. The PAMI (218) includes data communications endpoints (376, 378, and, e.g., 338, 340, 342, 344 on FIG. 10), with each endpoint specifying data communications parameters for a thread (e.g., 251, 252, 253, 254 on FIG. 10) of execution on a compute node, including specifications of a client (e.g., 302, 303, 304, 305 on FIG. 7), a context (290, 292, 310, 312 on FIG. 10), and a task (e.g., 332, 33, 334, 336 on FIG. 10), all as described above in this specification with reference to FIGS. 1-10. The endpoints are coupled for data communications through the PAMI (218) and through data communications resources (e.g., 238, 240, 242, 246, 106, 108, 227 on FIG. 8A). Any two of the endpoints can be located on the same compute node or on different compute nodes.

The method of FIG. 11 includes establishing (356) by an application-level entity (158), for collective operations of the PAMI, a data communications geometry (404). The geometry specifies, for tasks representing processes of execution of the parallel application, a set of endpoints that are used in collective operations of the PAMI, including a plurality of endpoints for one of the tasks. Of course these are PAMI tasks, where each task represents a canonical process of execution of the parallel application, and data communications in support of collective operations are from process to process traditionally with one endpoint per task—although alternatively, one or more of the tasks can have more than one endpoint in support of additional parallelism in data communications.

As mentioned, the geometry (404) specifies, for tasks representing processes of execution of the parallel application, a set of endpoints (405) that are used in collective operations of the PAMI. Each endpoint (405) specifies communications parameters for a combination of a task (406), a client (408), and a context (410), a fact further explained with reference to Table 1.

TABLE 1

An Example Geometry For A PAMI

| Endpoint | Task | Client | Context |
|---|---|---|---|
| $ep_0$ | $t_0$ | $cl_0$ | $co_0$ |
| $ep_1$ | $t_0$ | $cl_0$ | $co_1$ |
| $ep_2$ | $t_0$ | $cl_0$ | $co_2$ |
| $ep_3$ | $t_1$ | $cl_0$ | $co_3$ |
| $ep_4$ | $t_2$ | $cl_0$ | $co_4$ |
| ... | ... | ... | ... |
| $ep_{N-3}$ | $t_{N-3}$ | $cl_1$ | $co_{N-3}$ |
| $ep_{N-2}$ | $t_{N-2}$ | $cl_1$ | $co_{N-2}$ |
| $ep_{N-1}$ | $t_{N-1}$ | $cl_1$ | $co_{N-1}$ |

Each row in Table 1 represents an endpoint of a PAMI, with each of N endpoints identified by an endpoint identifier $ep_0 \ldots ep_{N-1}$. Similarly, N tasks are identified as $t_0 \ldots t_{N-1}$. In this example, the endpoints are composed with only two clients, $cl_0$ and $cl_1$, two collections of data communications resources dedicated to the use of the application. Each endpoint includes a separate context, $co_0 \ldots co_{N-1}$, the number of contexts N being the same as the number of endpoints in the geometry illustrated by Table 1, with each context $co_0 \ldots co_{N-1}$ composed of a separate subset of one of the two collections of data processing resources of the clients $cl_0$ and $cl_1$.

An application-level entity is an application, an instance of a parallel application, or an application messaging module, sometimes referred to in this discussion simply as an application. To establish (356) a geometry (404), an application-level entity, either at PAMI initialization, or later, dynamically, at run time, can call a PAMI initialization function (316 on FIG. 7) configured to establish a geometry by reading the geometry (404 on FIG. 7) from a PAMI configuration (318 on FIG. 7) or by using such configuration information as a prototype of a geometry to be configured at run time. The application can include in the geometry the endpoints defined for it in the PAMI configuration (318 on FIG. 7), or the application can dynamically add additional endpoints to augment parallel operations in a manner that will in fact be transparent to the application at run time.

In the method of FIG. 11, establishing (356) a data communications geometry (404) includes associating (358) with the geometry a list of collective algorithms (360) valid for use with the endpoints of the geometry. The list (360) is 'for use with the endpoints of the geometry' in the sense that, when an advance function finds a collective instruction in its work queue, the advance function makes a determination which collective algorithm to apply by consulting the list (360). Constructing such a list (360) of algorithms can be carried out at PAMI initialization by, for example, a call by an application-level entity to a PAMI initialization function (316 on FIG. 7) that either reads the list from a PAMI configuration (318 on FIG. 7) or constructs the list from a prototype list (360 on FIG. 7). The collective algorithms (360) are presented here in a structure (360) that uses a geometry identifier value (398) as a foreign key to associate the algorithm list (360) and the geometry (404). The algorithm list (360) in the example of FIG. 11, for ease of illustration, includes only the collective algorithms for a BROADCAST (400) and a SCATTER (402), but readers will recognize that such lists in actual embodiments also can include algorithms for other additional types of collective operations, GATHERs, REDUCEs, ALLGATHERs, ALLREDUCEs, including many variations according to particular collective operations, computer architectures, availability of tree networks or mesh networks, whether shared memory segments are available, whether data buffers are disposed upon memory boundaries, whether the number of endpoints in a geometry is even, odd, or a power of two, and so on. In the particular example of FIG. 11, the BROADCAST algorithm (400) in the list (360) can be, for example, a BROADCAST algorithm optimized for data communications on a network organized as a binary tree with eager-type data communications and active dispatch and done callbacks. In the particular example of FIG. 11, the SCATTER algorithm (402) in the list (360) can be, for example, a SCATTER algorithm optimized for data communications on a network organized as a regular, rectangular torus with rendezvous-type data communications and active dispatch and done callbacks.

Because collective operations involve data communications, configuration of a list of collective algorithms for a geometry also depends upon the nature of underlying data communications resources available to carry out any particular collective operation. Available collective algorithms include without limitation the following examples:

collective algorithms optimized for data communications on a network organized as a binary tree,
   collective algorithms optimized for data communications on a network organized as a mesh or torus,
   collective algorithms optimized for data communications on a network organized as a mesh or torus having a regular rectangular or cubical shape,
   collective algorithms optimized for data communications on a network organized as a mesh or torus having an irregular shape,
   rendezvous network-based collective algorithms implementing data communications in which both origin or root endpoints and target endpoints communicate and participate in a data transfer, appropriate for longer messages, typically composed of handshakes transferring header information followed by packet switched messaging or DMA operations to transfer payload data,
   eager network-based collective algorithms implementing data communications in which only the origin or root endpoint conducts a data transfer, merely informing the target endpoint that the transfer has occurred, but requiring no communications or other participation from the target endpoint,
   rendezvous collective algorithms implementing data communications with operations conducted, not through a network, but through shared memory, in which both the origin or root endpoints and target endpoints communicate and participate in a data transfer,
   eager collective algorithms implementing data communications conducted, not through a network, but through shared memory, in which only the origin or root endpoint conducts a data transfer, merely informing target endpoints that the transfer has occurred, but requiring no communications or other participation from the target endpoints,
   collective algorithms implementing network-based DMA PUT types of data communications, useful for fast transfers of small messages, sometimes containing header data and payload data in a single transfer or packet—DMA algorithms also can be used as components of other algorithms—as for example a SEND algorithm that does an origin-target handshake and then conducts payload transfers with PUTs,
   collective algorithms implementing DMA PUT types of data communications with transfers through shared memory, again useful for fast transfers of small messages, sometimes containing header data and payload data in a single transfer or packet—DMA algorithms also can be used as components of other algorithms—as for example a SEND algorithm that does an origin-target handshake through a segment of shared memory and then conducts payload transfers with PUTs,
   collective algorithms implementing data communications based on DMA GET operations, either networked or through shared memory, and
   collective algorithms implementing data communications instruction types that include eager or rendezvous RECEIVE operations, either with send-side matching of SENDs or with receive-side matching.

The method of FIG. 11 also includes registering (359), by the application (158) in each endpoint (378) in the geometry, a dispatch callback function (419) for a collective operation (420). In this example, each callback (419) is also associated with a dispatch identifier ('ID') (418) in a registry (416), and each endpoint (378) in the geometry contains such a registry, further explained with reference to Table 2.

TABLE 2

An Example Registry

| Collective Operation | Dispatch ID | Dispatch Callback |
|---|---|---|
| BROADCAST | $D_0$ | $callback_0$ |
| SCATTER | $D_1$ | $callback_1$ |
| GATHER | $D_2$ | $callback_2$ |
| REDUCE | $D_3$ | $callback_3$ |
| ... | ... | ... |

Each record in Table 2 represents a registration of a dispatch callback function (419) for a collective operation (420). Each record identifies a collective operation, BROADCAST, SCATTER, GATHER, and so on, for which a dispatch callback function is registered. Each record specifies a registered dispatch callback function, $callback_0$, $callback_1$, and so on. And each record matches a dispatch identifier with a callback function, $D_0$ for $callback_0$, $D_1$ for $callback_1$, and so on. The dispatch ID is an optional addition for convenience in data communications; the dispatch ID is an index value for the location of each callback in the registry (416), or, alternatively, in the algorithm list (360), useful in data communications because it is a smaller value than a callback as such which is either a callback function as such or a pointer to a callback function. Readers will also recognize that the inclusion of the Collective Operations column in the records of Table 2 is merely for clarity of explanation; such a column would be optional in embodiments where the only requirement is to be able locate a particular callback function in the registry.

For an active collective operation to function correctly, each participating endpoint must possess the pertinent dispatch callback. In the example of FIG. 11, therefore, registering (359) the dispatch callback function occurs before execution of an instruction for a collective operation. The application (158), meaning each and every instance of a parallel application, registers (359) the dispatch callback (419), by a call to a context function in a context of an endpoint, such as, for example:

PAMI_amdispatch_set(algorithm, dispatch_id, callback);

The 'am' in 'amdispatch_set' represents 'active message.' A call to a function such as PAMI_amdispatch_set is nonblocking; called from an application, the function returns immediately. All three parameters, algorithm, dispatch_id and the callback can be overloaded as arrays, so that multiple dispatch sets can be issued and coalesced into a single operation.

The method of FIG. 11 also includes executing (426), by the application (158), also without blocking, through a single one of the endpoints (376) in the geometry, an instruction (390) for the collective operation. The instruction specifies communications of transfer data (384) among the endpoints (378) of the geometry. The instruction also specifies an identifier (366) of the dispatch callback function (419) associated with the collective operation and a collective algorithm (420) that the PAMI will follow in carrying out the collective operation. The instruction parameters include an instruction type, whether it is a BROADCAST, a SCATTER, and so on. The instruction includes other parameters (383), for example, the location of the transfer data in computer memory, the quantity of transfer data, transfer destinations, and so on.

In this example, the instruction is executed by only a single instance of the parallel application (158), the instance executing in a process (428) represented by the task of the single endpoint, the root task of the collective operation. All instances of the application executing in processes composing the parallel application execute the registration instruction (359), but only the instance of the application at the root of the collective operation executes the collective instruction (390). In the method of FIG. 11, each instance of the parallel application (158) tests whether that instance is the root (422), but only one of them answers 'yes.' And only that instance executes (426) the instruction (390) for the collective operation. All other instances of the application continue processing (424) without executing the instruction (390). In pseudocode for the call site, this can be represented by:

```
if(root)
    execute_instruction(...);
else /* not the root */
    continue_processing(...);
```

In this example, executing (426) the instruction for the collective operation includes posting (480) by that instance of the application the instruction (390) in a work queue of a context in the single endpoint (376). That single endpoint (376) being the endpoint comprising the task that represents the process of execution (428) in which that instance of the application (158) is executing. The single instance of the application that represents the root of the collective operation executes (426) collective instruction (390) by a call to a context function in a context of the single endpoint (482), such as, for example:

```
amBroadcast(context, algorithm, dispatch_id, src_buffer,
    buffer_size, done_callback);
```

Here 'amBroadcast' represents 'active message broadcast,' a function that posts to the context identified in the 'context' parameter and specifies to the PAMI the use of the collective algorithm of the 'algorithm' parameter. This example function identifies the location of the transfer data as 'src_buffer' for 'source' buffer and the quantity of transfer data as 'buffer_size.' This example function also registers in the PAMI for later use, upon completion of the subject transfer of data, a done callback function as 'done_callback.' And this example function provides an identifier, in 'dispatch_id,' of the dispatch callback function previously registered each endpoint of the geometry.

In the method of FIG. 11, executing (426) an instruction (390) for the collective operation also includes receiving (362) the instruction in the single endpoint (376); that is, an advance function (482) of the context in the endpoint (376) where the instruction (390) is posted (480) finds the instruction in its work queue. In this example, the received instruction (390) is characterized by an instruction type (382) that specifies communications of transfer data among the endpoints (378) of the geometry. Types of such a collective instruction include the following example instruction types:
 a BROADCAST instruction requiring transfer of the entire contents of a send buffer from an endpoint of a root task to endpoints of all the tasks in the geometry,
 a SCATTER instruction requiring transfer of corresponding segments of a send buffer from an endpoint of a root task to endpoints of all the tasks in the geometry,
 a GATHER instruction requiring transfer of the entire contents of send buffers from endpoints of all the tasks in the geometry to corresponding segments of a receive buffer of an endpoint of a root task, and
 a REDUCE instruction requiring transfer of, as well as a logical or mathematical operation upon, the entire contents of send buffers from endpoints of all the tasks in the geometry to corresponding segments of a receive buffer of an endpoint of a root task.

The advance function (482) transmits (364) the transfer data (384) from the single endpoint (376) to all the endpoints (378) in the geometry. In this example, all endpoints in the geometry receive all of the transfer data, including endpoint (376), also labeled endpoint '0,' the endpoint that originates the transfer. The term 'geometry' is chosen to represent a collection of endpoints and tasks because it implies a shape for data communications. In FIG. 12 it is seen that among a collection of receive buffers (414), there is a receive buffer for each task in the geometry. In the example of FIG. 12, it is taken that each task has a single target receive buffer. Because all the transfer data is sent to all endpoints of the geometry, endpoint 0, the sender, is also a receiver of the transfer data.

The transfer data (384) includes in metadata, header data, or the like, the dispatch identifier (366) that identifies the dispatch callback function (419) associated with the collective operation (420). At this point in processing, all endpoints (378) are configured with the dispatch callback function (419) indexed by the dispatch identifier (418) for messaging in support of collective operations, and only the endpoint (376) operating on behalf of the root task actually receives and executes the corresponding collective instruction (390). This processing architecture, in which only one instance of an application executes a collective instruction is made possible because all the endpoints will carry out the proper data processing through their registered dispatch callbacks upon receiving transfer data from the root endpoint—as in a BROADCAST or SCATTER, for example—that contains a dispatch identifier (366) identifying the pertinent, previously registered, dispatch callback function (419). The method of FIG. 11 also includes executing (370) the identified dispatch callback function (419) by all the endpoints in the geometry, that is, executing the dispatch callback function identified by the dispatch identifier (366) in the transfer data (384).

Example embodiments of the present invention are described largely in the context of a fully functional parallel computer that implements endpoint-based parallel data processing in a PAMI. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of endpoint-based parallel data processing with non-blocking collective instructions in a parallel active messaging interface ('PAMI') of a parallel computer, the parallel computer comprising a plurality of compute nodes that execute a parallel application, the PAMI comprising data communications endpoints, each endpoint comprising a specification of data communications parameters for a thread of execution on a compute node, including specifications of a client, a context, and a task, the endpoints coupled for data communications through the PAMI, the method comprising:

establishing by the parallel application a data communications geometry, by:

calling, by an application-level entity, a PAMI initialization function configured to establish the geometry by reading the geometry from a PAMI configuration, the geometry specifying, for tasks representing processes of execution of the parallel application, a set of endpoints that are used in collective operations of the PAMI, and associating with the geometry a list of collective algorithms for collective operations valid for use with the endpoints of the geometry read from the PAMI configuration, wherein the list of collective algorithms is dependent upon a nature of underlying data communications resources available to carry out any particular collective operation;

registering, by the parallel application in each endpoint in the geometry, a dispatch callback function for each of the collective operations; and executing, by the parallel application without blocking, through a single one of the endpoints in the geometry, an instruction for one of the collective operations, the instruction specifying communications of transfer data among the endpoints of the geometry, an identifier of the dispatch callback function associated with the collective operation, and the collective algorithm, wherein each endpoint of the set of endpoints executes the dispatch callback function identified by the transfer data.

2. The method of claim 1 wherein executing an instruction for one of the collective operations comprises executing the instruction by only a single instance of the parallel application.

3. The method of claim 1 wherein:

the method further comprises determining by an instance of the parallel application executing in a process of execution on the parallel computer that the instance is a root of the collective operation; and executing an instruction for one of the collective operations includes posting by the instance the instruction in a work queue of a context in the single endpoint, the single endpoint being an endpoint comprising a task that represents the process of execution in which the instance is executing.

4. The method of claim 1 wherein:

the method further comprises executing the identified dispatch callback function by all the endpoints in the geometry.

5. The method of claim 1 wherein:

each client comprises a collection of data communications resources dedicated to the exclusive use of an application-level data processing entity;

each context comprises a subset of the collection of data processing resources of a client, context functions, and a work queue of data transfer instructions to be performed by use of the subset through the context functions operated by an assigned thread of execution; and each task represents a process of execution of the parallel application.

6. The method of claim 1 wherein each context carries out, through post and advance operations, data communications for the parallel application on data communications resources in the exclusive possession of that context.

7. The method of claim 1 wherein each context carries out data communications operations independently and in parallel with other contexts.

* * * * *